United States Patent
Ebert et al.

(10) Patent No.: US 7,788,336 B2
(45) Date of Patent: Aug. 31, 2010

(54) FEEDBACK SYSTEM FOR VISUAL CONTENT

(75) Inventors: Peter S. Ebert, Menlo Park, CA (US); Michael Heinrich, Mountain View, CA (US); Ian J. Kimbell, Malschenberg (DE); Janaki P. Kumar, Palo Alto, CA (US); Steven Mann, New York, NY (US); Frederic E. Samson, Philadelphia, PA (US); Bernhard Schweizer, Leimen (DE); Zia Yusuf, Los Altos, CA (US)

(73) Assignee: SAP AG, Walldorf (DE)

( * ) Notice: Subject to any disclaimer, the term of this patent is extended or adjusted under 35 U.S.C. 154(b) by 1089 days.

(21) Appl. No.: 10/880,512

(22) Filed: Jul. 1, 2004

(65) Prior Publication Data

US 2005/0192853 A1    Sep. 1, 2005

Related U.S. Application Data

(60) Provisional application No. 60/548,097, filed on Feb. 27, 2004.

(51) Int. Cl.
    *G06F 15/16* (2006.01)
(52) U.S. Cl. ..................................................... 709/217
(58) Field of Classification Search ................. 709/217; 715/731, 246
    See application file for complete search history.

(56) References Cited

U.S. PATENT DOCUMENTS

| 5,537,618 | A | * | 7/1996 | Boulton et al. | 715/745 |
| 5,893,098 | A | | 4/1999 | Peters et al. | |
| 6,134,531 | A | * | 10/2000 | Trewitt et al. | 705/10 |
| 6,189,029 | B1 | | 2/2001 | Fuerst | |
| 6,260,064 | B1 | * | 7/2001 | Kurzrok | 709/224 |
| 6,421,724 | B1 | | 7/2002 | Nickerson et al. | |
| 6,477,504 | B1 | | 11/2002 | Hamlin et al. | |

(Continued)

OTHER PUBLICATIONS

3M, "Post-it® Software Notes: Overview," undated materials, copyright 2003, [online], [retrieved from the Internet on May 7, 2004: http://www.3m.com/market/office/postit/com_prod/psnotes/index.html], 3 pgs.

(Continued)

*Primary Examiner*—William C Vaughn, Jr.
*Assistant Examiner*—Thomas Richardson
(74) *Attorney, Agent, or Firm*—Fish & Richardson P.C.

(57) ABSTRACT

A feedback system for visual content is described that allows individual users to obtain feedback regarding selected visual content. A user of the system uploads any desired visual content, and associates the content with a feedback campaign having user-defined characteristics. The user also may associate feedback elements with the visual content, such as comments regarding the visual content or the type of feedback that is desired. The feedback system provides the visual content and feedback elements to selected other users, perhaps by sending a link to the other users via email. In this way, the receiving users may provide feedback regarding the visual content. In particular, the receiving users may generate a virtual note to be placed on a selected portion of the visual content, so as to provide comment specific to the selected portion. As a result, individual users are enabled to create and manage multiple feedback campaigns.

23 Claims, 21 Drawing Sheets

U.S. PATENT DOCUMENTS

| | | | |
|---|---|---|---|
| 6,581,071 B1 | 6/2003 | Gustman et al. | |
| 6,606,581 B1 | 8/2003 | Nickerson et al. | |
| 6,618,746 B2 | 9/2003 | Desai et al. | |
| 6,874,125 B1 | 3/2005 | Carroll et al. | |
| 6,963,898 B2 | 11/2005 | Yoshimine et al. | |
| 7,313,621 B2* | 12/2007 | Gudorf et al. | 709/227 |
| 7,428,505 B1 | 9/2008 | Levy et al. | |
| 7,487,121 B2 | 2/2009 | Swarna et al. | |
| 2002/0016848 A1* | 2/2002 | Yoshimine et al. | 709/231 |
| 2002/0129052 A1 | 9/2002 | Glazer et al. | |
| 2003/0001887 A1 | 1/2003 | Smith | |
| 2003/0005465 A1* | 1/2003 | Connelly | 725/119 |
| 2003/0050994 A1* | 3/2003 | Pollack | 709/217 |
| 2003/0152904 A1 | 8/2003 | Doty, Jr. | |
| 2004/0019688 A1* | 1/2004 | Nickerson et al. | 709/229 |
| 2004/0030697 A1* | 2/2004 | Cochran et al. | 707/9 |
| 2004/0049534 A1* | 3/2004 | Nickerson et al. | 709/203 |
| 2004/0061720 A1 | 4/2004 | Weber | |
| 2004/0128183 A1 | 7/2004 | Challey et al. | |
| 2004/0176992 A1 | 9/2004 | Santos et al. | |
| 2004/0189716 A1 | 9/2004 | Paoli et al. | |
| 2004/0264447 A1 | 12/2004 | McEvilly et al. | |
| 2007/0268271 A1* | 11/2007 | Kinjo | 345/173 |

OTHER PUBLICATIONS

Eight Days, Inc., "Hot or Not," undated materials, copyright 2000-2004, [online], [retrieved from the Internet on May 7, 2004: http://www.hotornot.com/], 4 pgs.

Gadwin Systems, Inc., "Diagram Studio," undated materials, [online], [retrieved from the Internet on May 10, 2004: http://www.gadwin.com/products.htm], 2 pgs.

Gadwin Systems, Inc., "Gadwin PrintScreen," undated materials, [online], [retrieved from the Internet on May 10, 2004: http://www.gadwin.com/printscreen/], 2 pgs.

Microsoft Corporation, "The Customer Experience Improvement Program: Continuing Software Improvement at Microsoft," undated materials, copyright 2000, [online], [retrieved from the Internet Jan. 9, 2004: http://www.microsoft.com/products/ceip/english/default.htm], 3 pgs.

OpinionLab, Inc., "OpinionLab OnlineOpinion Web User Feedback System: A Proven System to Monitor and Improve the Online User Experience Based on Continuously Listening to Visitors Across Your Entire Website," undated materials, copyright 2004, [online], [retrieved from the Internet Jan. 9, 2004: http://www.opinionlab.com/], 1 pg.

OpinionLab, Inc., "OpinionLab OnlineOpinion Web User Feedback System: More About OnlineOpinon," undated materials, copyright 2004, [online], [retrieved from the Internet Jan. 7, 2004: http://www.opinionlab.com/more_about_oo.asp], 2 pgs.

OpinionLab, Inc., "The OnlineOpinion System: Different From Other Feedback Techniques," undated materials, copyright 2002, [online], [retrieved from the Internet Jan. 9, 2004: http://www.opinionlab.com/PDF/OnlineOpinion_Different_from_Others.pdf], 3 pgs.

\* cited by examiner

FEEDBACK SYSTEM FOR VISUAL CONTENT

CROSS-REFERENCE TO RELATED APPLICATIONS

This application claims priority to U.S. Provisional Application Ser. No. 60/548,097, titled FEEDBACK SYSTEM FOR VISUAL CONTENT, and filed on Feb. 27, 2004.

TECHNICAL FIELD

This invention relates to user feedback systems for visual content.

BACKGROUND

A creator of visual content typically strives to ensure that developed visual content is aesthetically pleasing (or at least, aesthetically neutral) and/or effective in communicating a message or purpose of the content creator. For example, a designer of a web site must consider the appearance of the designed web site, while simultaneously ensuring that a purpose and functionality of each portion of the web site are clear to potential users. Similarly, advertisers seek to ensure that their advertisements will attract the attention of a target audience, while also conveying a message regarding the product.

In preparing visual content, it may be difficult for the designer to collect and aggregate feedback regarding either the aesthetic or functional nature of the visual content. For example, it may be difficult for the designer to identify a target audience of appropriate size for receiving and rating the visual content, or it may be difficult to provide the visual content to such a target audience. Even if the visual content is distributed to a selected target audience of appropriate size, it may be difficult for both the audience members and the designer of the visual content to provide/use the feedback in an effective way.

For example, if a user emails visual content to a number of other users (or posts content to a publicly-available website), the receiving/viewing users must find a way to verbally describe their opinions regarding the visual content, which may be cumbersome and ambiguous (for example, a receiving user might discuss a proposed web site design by saying that "the button in the upper left-hand corner next to the 'submit' button has an unclear function"). Generally speaking, then, the result of seeking feedback in this way is likely to be a string of responses (e.g., reply emails) that the originating user must individually read through in order to compile meaningful information and discard (or request follow-up on) ambiguous information.

Additionally, to the extent that such feedback requires effort and time on the part of receiving users, it becomes less likely that the receiving users will provide meaningful feedback at all. Somewhat similarly, if the originating user feels that the benefit from sifting through such feedback is outweighed by the non-trivial effort of making the visual content available in the first place, then the originating user may be less likely to solicit meaningful, large-scale feedback. This may be particularly true when a project or design must go through multiple revisions, since it may be difficult to correlate each revision with corresponding feedback for the purposes of comparison and tracking of progress.

Some conventional feedback systems do exist for providing feedback on visual content, and some of these may be operated in a centralized or standardized manner. However, such systems are typically limited to high-level opinions of the visual content as a whole (or of pre-defined portions), such as, for example, ranking an opinion of a picture on a scale of one to ten. Even if such systems provide an opportunity for viewing users to provide more detailed opinions than a simple ranking, the same problems discussed above may still arise (e.g., cumbersome for the viewing users to provide comment, and difficult to compile results). Moreover, such systems, even to the extent that they exist, are not typically available for use and control by any user, but are more likely implemented by a centralized administrator.

SUMMARY

According to one general aspect, a system includes a feedback service operable to receive visual content from a first user and provide the visual content to a second user together with feedback elements for obtaining feedback from the second user regarding the visual content, and an administration service operable to provide the visual content and feedback elements to the second user as part of a feedback campaign that is individually-tracked with respect to the first user, the administration service further operable to provide the first user with results of the feedback campaign.

Implementations may include one or more of the following features. For example, the administration service may be operable to store the visual content and the feedback in association with the feedback campaign and the first user. In this case, the administration service may be operable to register the first user according to a unique user identifier, so as to store the visual content and the feedback in association with the feedback campaign and the first user, according to the unique identifier.

The feedback service may be operable to receive the visual content by providing an upload screen to the first user with which the user identifies an image file containing the visual content, or by way of a screen capture tool activated by the first user while the visual content is being locally displayed to the first user. The feedback elements may include comments from the first user regarding the visual content or a type of desired feedback. The feedback elements may include a virtual note creator, the virtual note creator operable to allow the second user to place a virtual note on a selected portion of the visual content and thereby provide specific feedback regarding the selected portion.

The feedback elements may include a ranking scale for allowing the second user to rank the visual content or portion thereof according to criteria defined by the first user. In this case, the feedback elements may include ranking results compiled from a plurality of users and related to a first piece of visual content, while the second user views a second piece of visual content.

The administration service may be operable to receive campaign characteristics from the first user defining a duration and scope of the feedback campaign. The administration service may be operable to provide the visual content and the feedback elements to the second user by generating a link to the feedback campaign to be sent to the second user in an email to the second user, or by including the visual content and the feedback elements within an email to the second user. The administration service may include a results manager operable to compile results of the feedback campaign according to criteria selected by the first user.

According to another general aspect, visual content is received from a first user. The visual content and a user identifier associated with the first user are associated with a feedback campaign for obtaining feedback from a second user regarding the visual content, the visual content is provided to the second user along with feedback elements, the feedback is received from the second user, and the visual content, the user identifier, the feedback, and the feedback campaign are maintained in association with one another.

Implementations may include one or more of the following features. For example, in receiving visual content from the first user, the first user may be registered in association with the user identifier. In associating the visual content and the user identifier associated with the first user with the feedback campaign, campaign characteristics may be received from the first user defining a duration and scope of the feedback campaign.

In providing the visual content to the second user along with feedback elements, a virtual note creator may be provided, the virtual note creator operable to allow the second user to place a virtual note on a selected portion of the visual content and thereby provide specific feedback regarding the selected portion. Also, results of the feedback campaign may be provided according to criteria selected by the first user.

According to another general aspect, an apparatus includes a storage medium having instructions stored thereon. The instructions include a first code segment for receiving campaign characteristics describing a feedback campaign from a first user, a second code segment for receiving visual content from the first user and associating the visual content with the first user and the feedback campaign, a third code segment for providing the visual content and associated feedback elements to a second user, a fourth code segment for associating feedback from the second user, received by way of the feedback elements, with the visual content, and a fifth code segment for storing the feedback, the visual content, and the campaign characteristics in association with one another, to thereby form feedback campaign results.

Implementations may include one or more of the following features. For example, the apparatus may include a sixth code segment for providing the feedback campaign results according to criteria selected by the first user.

The third code segment may include a sixth code segment for providing a virtual note creator as one of the feedback elements, the virtual note creator operable to allow the second user to place a virtual note on a selected portion of the visual content and thereby provide specific feedback regarding the selected portion. Additionally, or alternatively, the third code segment may include a sixth code segment for providing the feedback elements, the feedback elements including comments from the first user regarding the visual content or a type of desired feedback.

The details of one or more implementations are set forth in the accompanying drawings and the description below. Other features will be apparent from the description and drawings, and from the claims.

DETAILED DESCRIPTION

Figure 1:
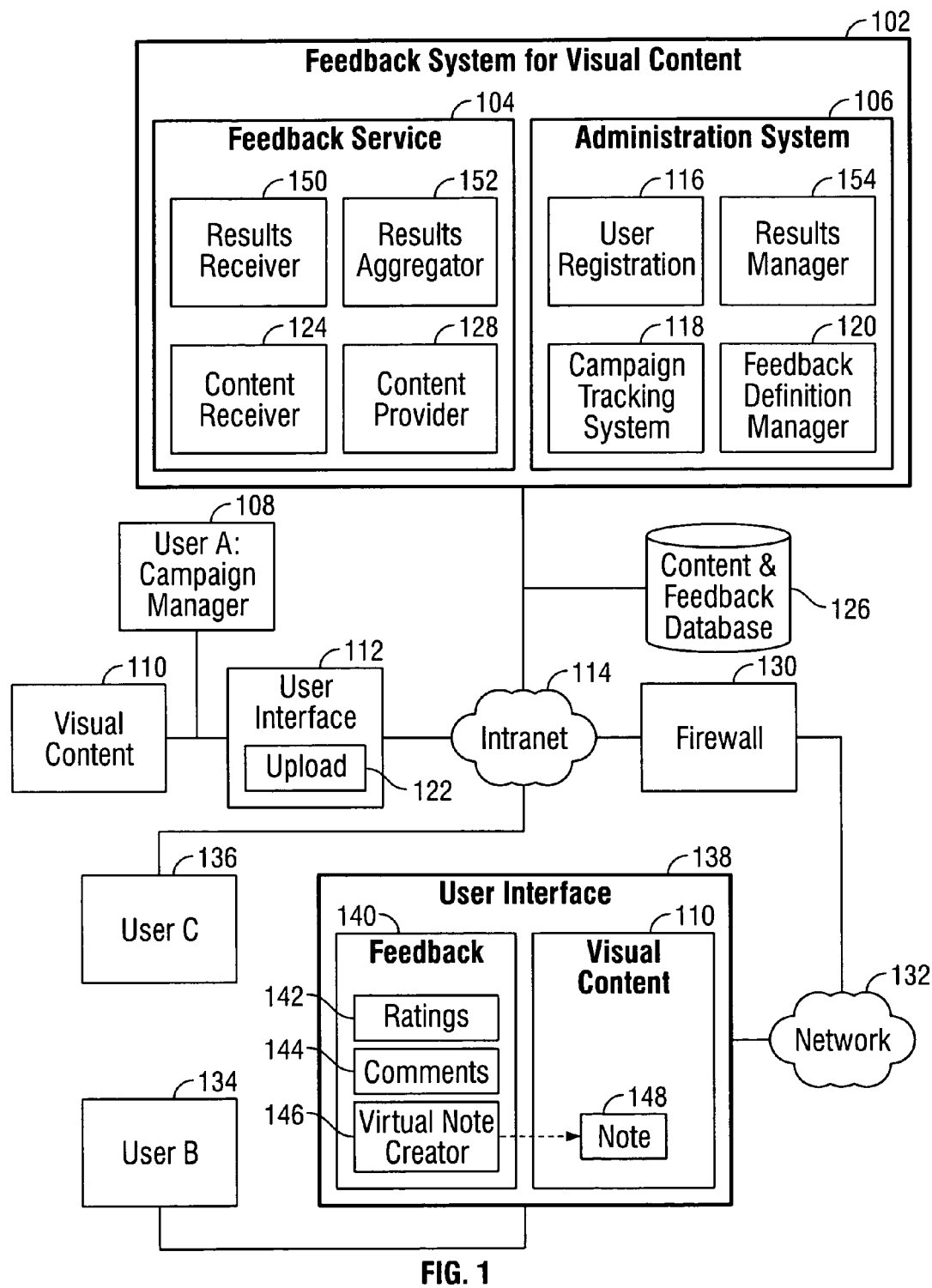
FIG. 1 is a block diagram of a feedback system for visual content.

FIG. 1 is a block diagram of a feedback system 102 for visual content. In FIG. 1, the system 102 includes a feedback service 104 for obtaining feedback from users, and an administration system 106 for allowing a managing user to create and oversee a particular campaign for feedback regarding one or more pieces of visual content.

In particular, in FIG. 1, a user A 108 is a campaign manager who has created or otherwise obtained a piece or pieces of visual content 110, and who wishes to conduct a campaign to obtain feedback from other users regarding the visual content 110. Accordingly, this campaign manager 108 uses a local user interface 112 to access an intranet 114. The intranet 114 may represent, for example, an enterprise-wide network, or any other type of private or semi-private computer network.

The campaign manager 108 accesses a user registration service 116 to register as a campaign manager and gain eligibility to use the feedback system 102. For example, the campaign manager may select a username and password, and receive permission to create and operate one or more campaigns for obtaining feedback.

Once the campaign manager 108 is registered, the campaign manager 108 accesses a campaign tracking system 118 to define at least an initial campaign. That is, the campaign manager 108 may define a name, duration, visual content nature, or other characteristic of the feedback campaign to be conducted. In this way, the campaign tracking system 118 creates a feedback campaign that is specific to the campaign manager 108 and to particular pieces of visual content 110, so that future feedback may be tracked and managed accordingly.

The campaign manager 108 also may access a feedback definition manager 120, with which the campaign manager 108 may provide comments about the relevant visual content, and/or define the type of feedback that is being sought. For example, a pre-determined list of feedback questions may exist, from which the campaign manager 108 may select for inclusion in the particular campaign being conducted.

The campaign manager 108 may then upload the visual content to the feedback system 102, using an upload functionality 122 of the user interface 110. In one implementation, a content receiver 124 provides a screen to the campaign manager 108, where the campaign manager 108 may simply "drag and drop" a locally-saved piece of visual content 110 to the screen. The content receiver 124 may operate in conjunction with the campaign tracking system 118 to ensure that the visual content 110 is continuously and properly associated with its corresponding campaign.

In another implementation, software may be included locally to the campaign manager 108 for uploading content in an easy, integrated manner. For example, a software application may be configured for convenient uploading of the visual content 110 to the feedback system 102. In one implementation, the campaign manager 108 may be viewing visual content anywhere on a local computer (e.g., scanned photographs, or a currently-viewed web site), and may simply hit the upload button 122, whereupon the campaign manager 108 is immediately queried as to which campaign the visual content 110 should be included. The upload button 122 may be a standard keyboard key, such as, for example, the "printscreen" key, with appropriately-assigned functionality, or may be assigned to a right-button function of a standard mouse device.

Similar software is provided by Gadwin Systems, Inc., which produces a freeware "PrintScreen" product for screen capture. Such a product, or a similar product, may be used to integrate the inclusion of comments regarding the visual content when uploading. Other screen capture features may be used, separately or in conjunction with such software. For example, the uploading user 108 may have an option to blur or obscure desired portions of the visual content, which may be confidential or irrelevant.

The content receiver 124 may store the visual content 110 in a database 126. As discussed in more detail below, the database 126 also may be used to store feedback information received from users, and also may be used by the campaign tracking system 118 or other related systems to store campaign or other information, as needed. Of course, other/separate databases may be used for these purposes, and the database 126 may be internal or external to the feedback system 102.

Once the visual content 110 has been uploaded and stored in the context of a particular campaign, and the campaign manager 108 has defined/included any comments or questions to be included with the visual content, a content provider 128 makes the visual content and related information available to a defined pool of users. For example, the content provider 128 may email a link to the users, with an invitation or instruction regarding the link. As another example, the content provider 128 may include the visual content 110 and related information within an email to the users.

In FIG. 1, a firewall 130 provides security to users of the intranet 114, and shields communications traffic over the intranet 114 from being intercepted or disrupted by users of a public network 132, which may be, for example, the public Internet or other publically-available network. In this way, users of the intranet 114 may communicate securely and safely. Thus, in FIG. 1, the campaign manager 108 and other users of the intranet 114, such as, for example, employees of an enterprise running the intranet 114, may be provided access to the feedback system 102 as a benefit of employment. Nonetheless, the campaign manager 108 and other intranet users may be able to gain feedback from selected users, even those outside of the firewall 130 and on the public network 132. Of course, the feedback service 102 also may be operated over the publicly-available network 132, as a free or pay service to all users thereof.

In FIG. 1, the content provider 128 provides the visual content 110 and associated information to a user B 134 and a user C 136. It should be noted that the user C 136 is behind the firewall 130 and accesses the intranet 114, while the user B 134 is outside of the firewall 130 and accesses the public network 132. In this way, feedback campaigns may be conducted that include only internal users, or only external users, or some combination of the two user groups.

In FIG. 1, the user B 134 accesses a user interface 138 that displays the visual content 110 previously uploaded by the campaign manager 108 as described above. The user interface 138 also displays a feedback portion 140, with which information from the campaign manager 108 may be displayed, and feedback from the user B 134 may be collected.

The feedback portion 140 includes a ratings section 142, a comments section 144, and a virtual note creator 146. The ratings section 142 may include, for example, pre-defined questions with associated rating scales. For example, a question such as "what is your overall impression?" may be included with a selection scale of 1-5. Other questions or selection scales, previously determined by the campaign manager 108 and/or the feedback system 102, also may be included.

Also in the ratings section 142, rankings from the user B 134 and other users may be automatically displayed, as the user B 134 continues to provide feedback. For example, if the user B 134 answers a question about a portion of the visual content 110 by assigning a ranking to that portion, then, upon submission of the ranking, the rankings section 142 may display a cumulative ranking of the visual content portion, so that the user B 134 may receive information about feedback provided by other users.

The comments section 144 may refer to comments from the campaign manager 108, which may be displayed beside the visual content 110, or may be overlaid on a relevant portion of the visual content 110. Additionally, or alternatively, the comments section 144 may refer to an open interaction element which the user B 132 may use to enter free-form text regarding feedback on the visual content 110.

The virtual note creator 146 refers to a functionality that allows the user B 134 to provide pre-defined or free-form feedback regarding specific portions of the visual content 110. That is, the user B 134, by selecting the virtual note creator 146, may generate a virtual note 148 that the user B 134 may then freely place anywhere within or around the visual content 110. In this way, the user B 134 may provide specific comment on a particular portion of the visual content 110, without having to provide a written description of the particular portion of the visual content 110 in order to give context to the comment(s).

As shown below, the virtual note 148 may include a dropdown menu, ranking scale, or other pre-defined feedback type. The virtual note 148 also may include a box for allowing the user B 134 to enter free-form text comments. In this way, feedback entered using the virtual note 148 may be tracked and used in different ways. For example, although the virtual note 148 may include the above-described options for enabling the user B 134 to enter feedback, it is also possible that the virtual note 148 conveys information simply by its presence, without additional comment from the user B 134. For example, the virtual note 148 may be a red or green dot, used to generally and quickly imply negative or positive feedback, respectively, with respect to the portion of the visual content 110 where the dot(s) is placed.

Once the user B 134 has finished inputting feedback on the visual content 110, a results receiver 150 within the feedback service 104 receives the results and interacts with the campaign tracking system 118 to ensure that the results are properly associated with their respective campaigns. Then, the results may be input to a results aggregator 152 for accumulating information about the feedback, again with respect to a particular campaign.

For example, the results aggregator 152 may determine a composite rating for any pre-defined feedback scales (e.g., may determine that users gave an overall average impression of 4 on a scale of 1 to 5). The results aggregator 152 may accumulate such results from the virtual notes 148, and may aggregate the results across users, across different pieces/versions of visual content, or across different portions of the same visual content. In this way, information may be easily gleaned about problem areas experienced by users.

A results manager 154 allows the campaign manager 108 to manage the results as aggregated by the results aggregator 152. For example, the campaign manager 108 may select different views or compilations of the same results, or may view results across different campaigns. The campaign manager also may use various other applications to view the results. For example, results data may be downloaded into an Excel worksheet, or a PowerPoint presentation. In the case of an Excel worksheet, locations of the virtual notes may be recorded as x/y coordinates defined with respect to the visual content.

In the above description, the feedback system 102 is illustrated as containing the feedback service 104, which primarily relates to functionality that is typically common to all campaign managers, and the administration system 106, which primarily relates to the experience of individual campaign managers as they define, track, and use one or more campaigns. However, this functionality is merely one example, and it should be understood that the above areas of functionality are not intended to be restrictive, and could be defined or operated in a different manner.

For example, the functionality of the results aggregator 152 and the results manager 154 may overlap to some extent. As another example, some of the functionality of the feedback system 102 may be implemented locally by the campaign manager 108. For example, the upload functionality associated with the content receiver 124 and the upload 122 may be implemented locally.

In FIG. 1, it should be understood that the feedback system 102 provides a quick and easy method for internal and external end-users to provide feedback on visual content, including, for example, current or upcoming user interface designs. Individual users can self-register, create, manage, and analyze feedback campaigns. Internal and external users can rate, comment, and attach virtual notes to the visual content, and results of the feedback are immediately available to the initiating end-user. Moreover, as the user B 134 rates a first piece of visual content (or portion thereof) and views a second piece of visual content, results of feedback for the first piece of visual content may be instantly displayed to the user B 134. That is, the user B 134 may see a compilation (e.g., average rating) for the first piece of visual content, including the feedback provided by the user B 134.

As a result, the initiating end-user (e.g., the campaign manager 108) may feel empowered to shape his or her own work environment and business processes. Users expressing feedback feel that their opinion is desired and useful. An operator of the feedback system 102, e.g., an employer running the enterprise-wide intranet 114, may benefit from motivating and enabling internal and external end-users to continually provide feedback concerning new screen designs or screen sequences, while incorporating end-user expertise, creativity, and intelligence into the design of user interfaces and other visual content. Additionally, such an employer may have system-wide administrative and reporting capabilities for managing use of the feedback system 102.

Figure 2:
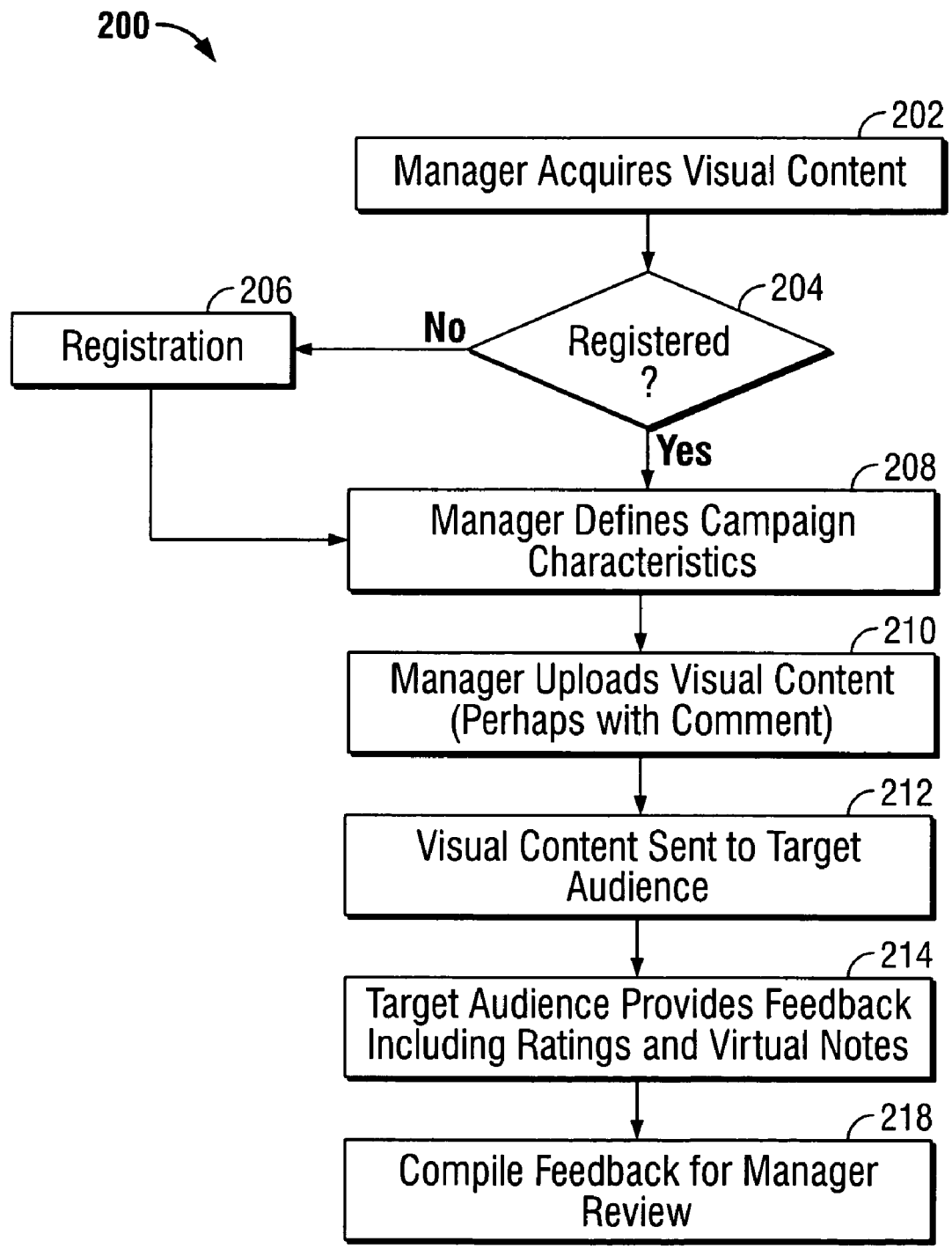
FIG. 2 is a flowchart illustrating a process for using the system of FIG. 1.

FIG. 2 is a flowchart illustrating a process for using the system of FIG. 1. In FIG. 2, the campaign manager 108 acquires the visual content 110 (202). This may mean scanning, downloading, or otherwise creating a file that is in a format compatible with the feedback system 102 (e.g., JPEG).

If the campaign manager 108 is not registered (204), then the campaign manager 108 may register by, for example, providing a username (or other identifier) and password (206). Then, or if the campaign manager 108 is previously registered, the campaign manager 108 may define characteristics of the campaign to be conducted (208). For example, the campaign manager 108 may decide that the campaign should have a particular list of recipients, or should have particular start and end dates.

The campaign manager 108 then uploads the previously-acquired visual content (210). As already mentioned, uploading may occur by a "drag-and-drop" process of placing a saved version of the visual content into a user interface screen for displaying the visual content of the campaign being conducted. Alternatively, the uploading may be an integrated process that facilitates uploading of visual content with a local environment of the campaign manager 108.

The visual content 110 and any associated comments or instructions are then sent to a target audience of users (212), who provide their feedback using any of the available techniques, including the pre-defined ratings and/or virtual notes (214).

Finally, this feedback is compiled for viewing and consideration by the campaign manager 108 (218). Conveniently, the campaign manager 108 is able to view the feedback using any conventional browser software, simply by accessing the feedback system 102 and providing an appropriate user id and password.

Figure 3:
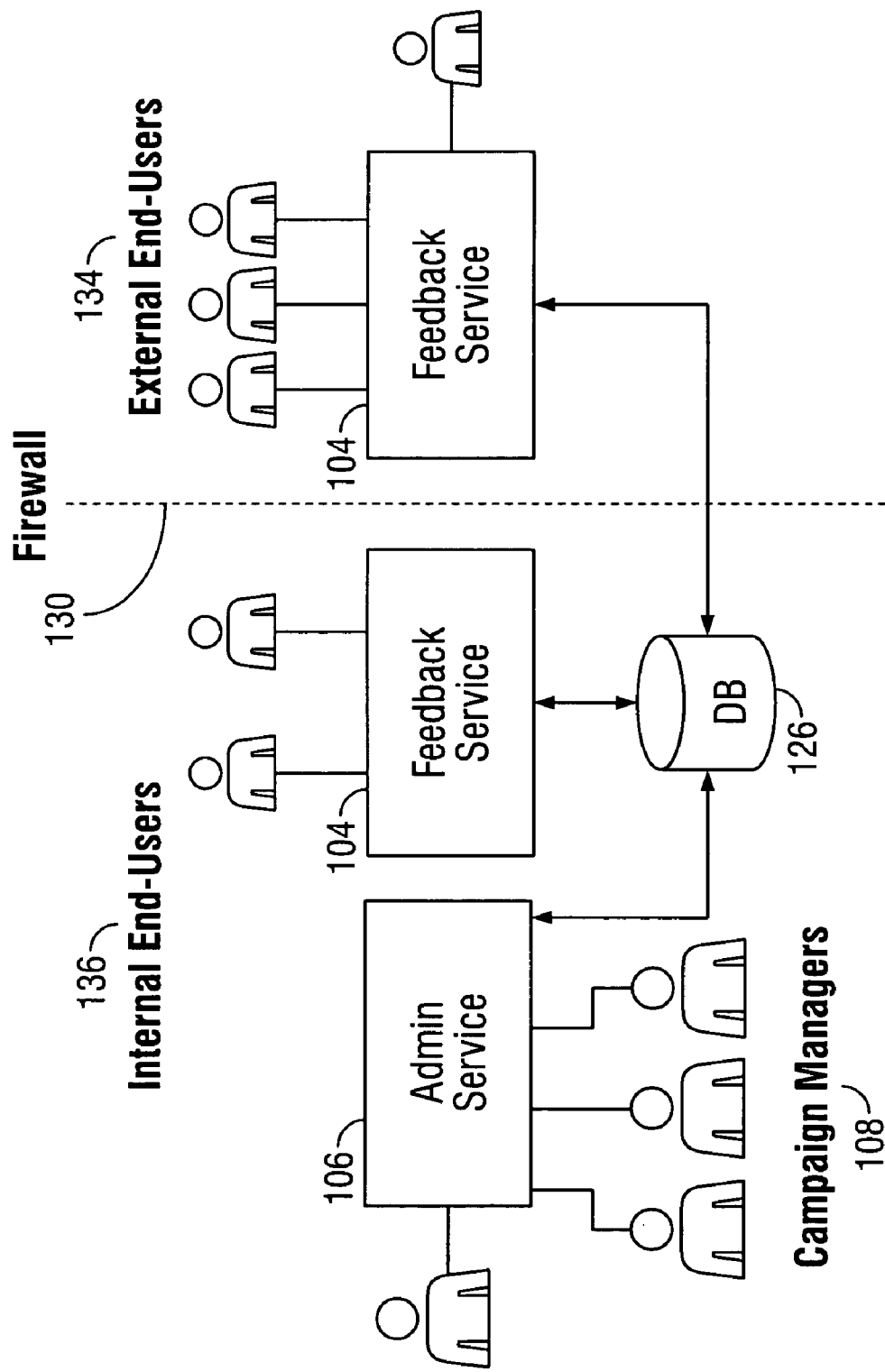
FIG. 3 is a diagram of one implementation of the system of FIG. 1.

FIG. 3 is a diagram of one implementation of the system of FIG. 1. In FIG. 3, the functionality of the feedback system 102 is architected such that the campaign managers interact primarily or completely with the administration service or system, while the feedback service interacts with the audience of users, whether internal or external to the firewall. As in FIG. 1, the campaign managers can instantly create and run internal and external feedback campaigns, and are able to see and manage their visual content and feedback information.

Figure 4:
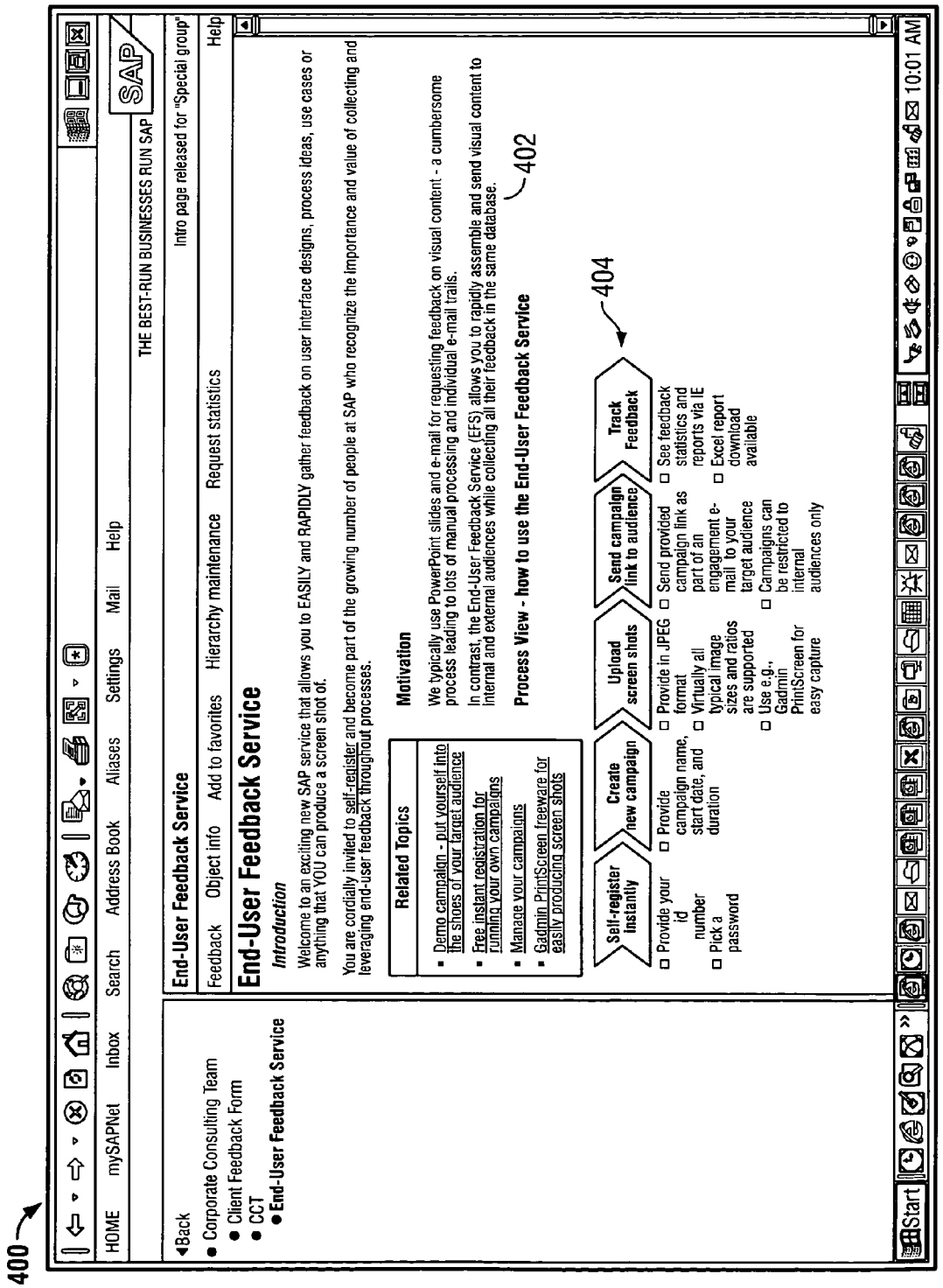
FIGS. 4-16 are screenshots of a first implementation of the system of FIG. 1.

FIGS. 4-16 are screenshots of a first implementation of the system 102 of FIG. 1. In FIG. 4, an introductory screen 400 provides information regarding an initial use of the system 102 of FIG. 1. Specifically, a section 402 describes the system 102 and some of its associated advantages, while a section 404 provides an overall process flow of how to use the system 102, similar to the process described above with respect to FIGS. 1 and 2.

Figure 5:
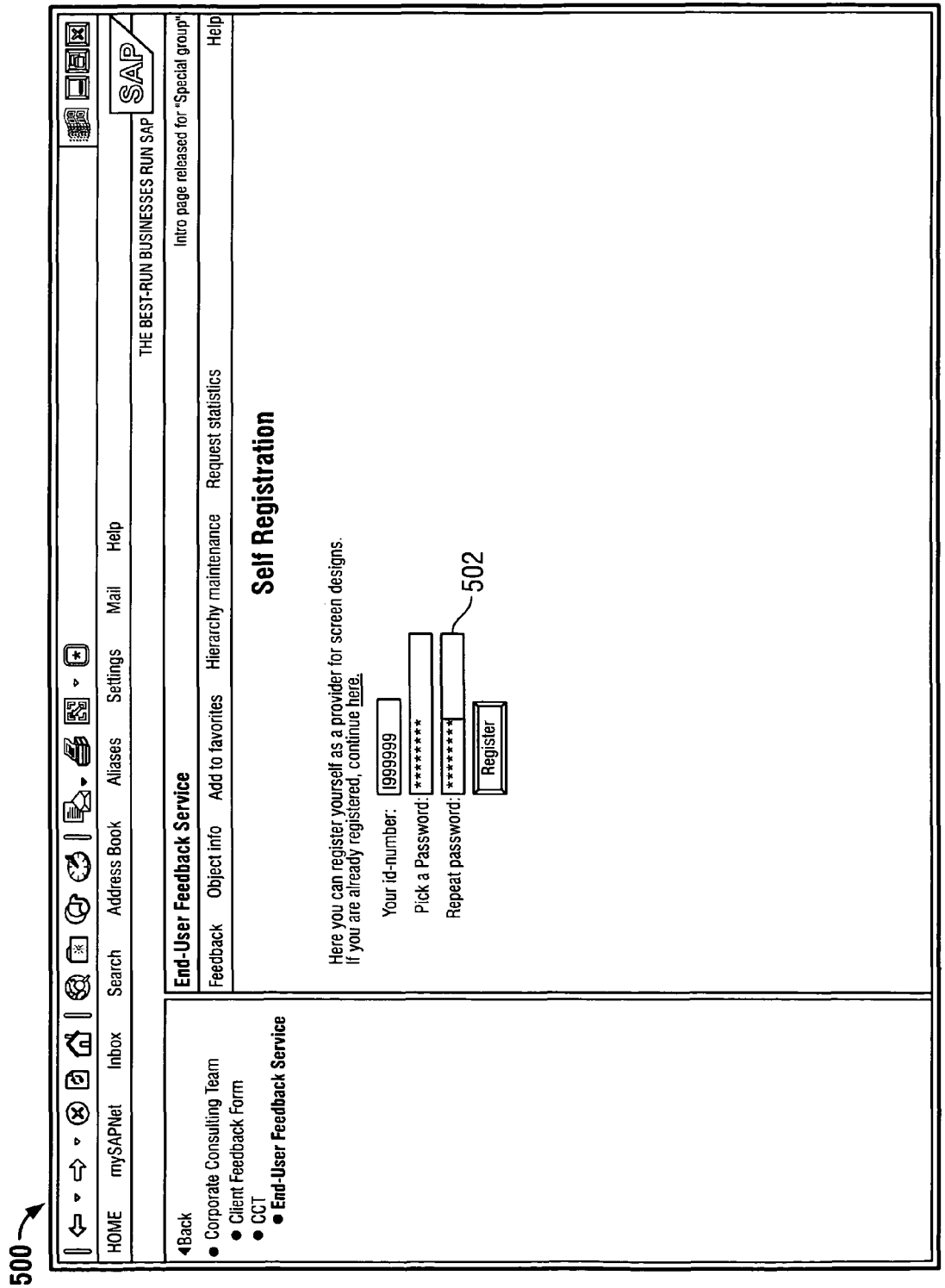

In FIG. 5, a screen 500 illustrates an example of a self-registration screen, in which the campaign manager 108 provides an identifier number (id) and password information into a section 502. It should be understood that this self-registration feature provides an easy and convenient way for the campaign manager 108 to use the feedback system 102, without requiring assistance or involvement of an administrator of the system 102. Also, if a user has previously registered, then a separate screen may be used to allow registered users to access the system 102 (i.e., login to the system 102) by re-entering their user id and password.

Figure 6:
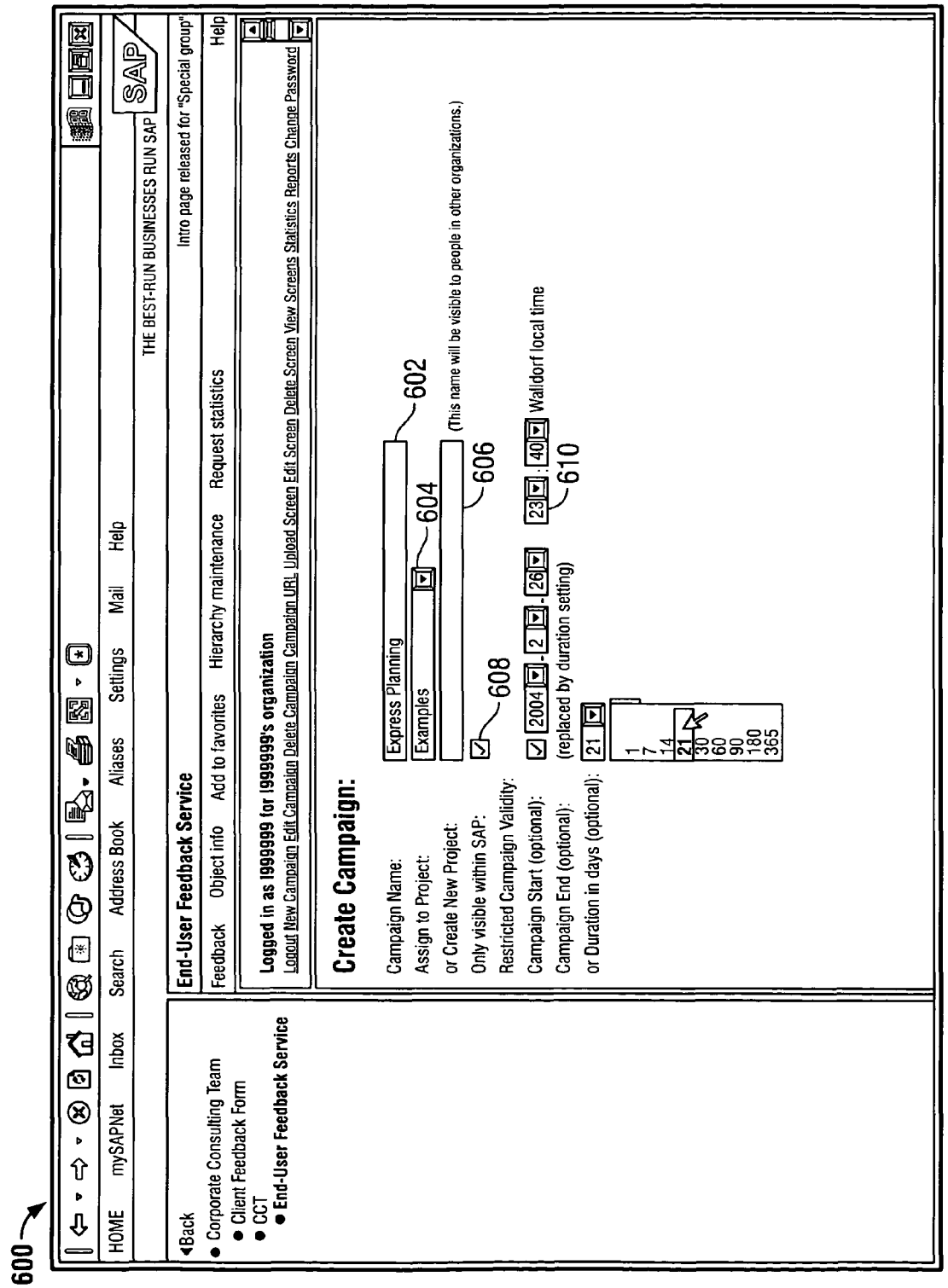

In FIG. 6, a screen 600 allows the campaign manager 108 to create a new campaign for obtaining feedback regarding one or more pieces of visual content. In FIG. 6, the campaign manager 108 names the campaign "Express Planning" in a section 602, and associates the campaign with an existing or new project, using sections 604 and 606, respectively.

Then, the campaign manager 108 may restrict visibility or use of the campaign to users of the intranet 114 using a section 608. Finally, in a section 610, the campaign manager 108 may designate a start date, end date, and/or duration of the campaign.

Figure 7:
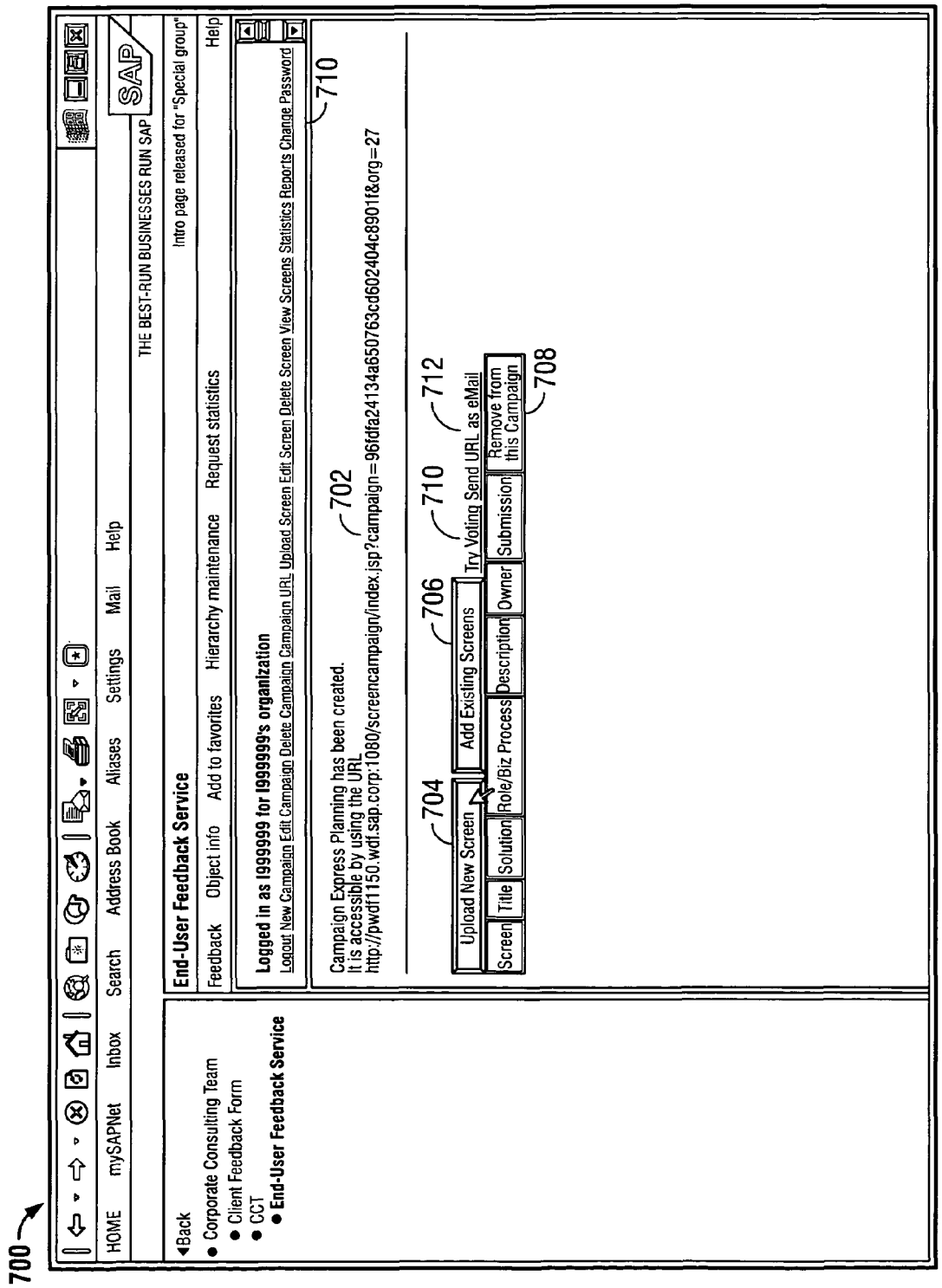

FIG. 7 is a screenshot of a screen 700 for administrating the campaign. In a section 702, the campaign manager 108 may access the campaign by way of the provided Uniform Resources Locator (URL). As will be seen, the campaign manager 108 may upload visual content (e.g., a screen design) using a button 704, or may add an already-uploaded screen using a button 706. A table 708 categorizes information about visual content to be added to the campaign, while a link 710 provides access to voting on the visual content and a link 712 allows the campaign manager 108 to send the URL as part of an e-mail message.

Finally, a section 710 provides access to various administrative functionalities, including management of campaigns (e.g., adding, editing, or deleting a campaign, or accessing a campaign URL), as well as management of individual screens within campaigns (e.g., adding, editing, deleting, or viewing screens). The section 710 also allows the campaign manager 108 to access statistics or reports regarding feedback results from a particular campaign or regarding a particular piece of visual content.

Figure 8:
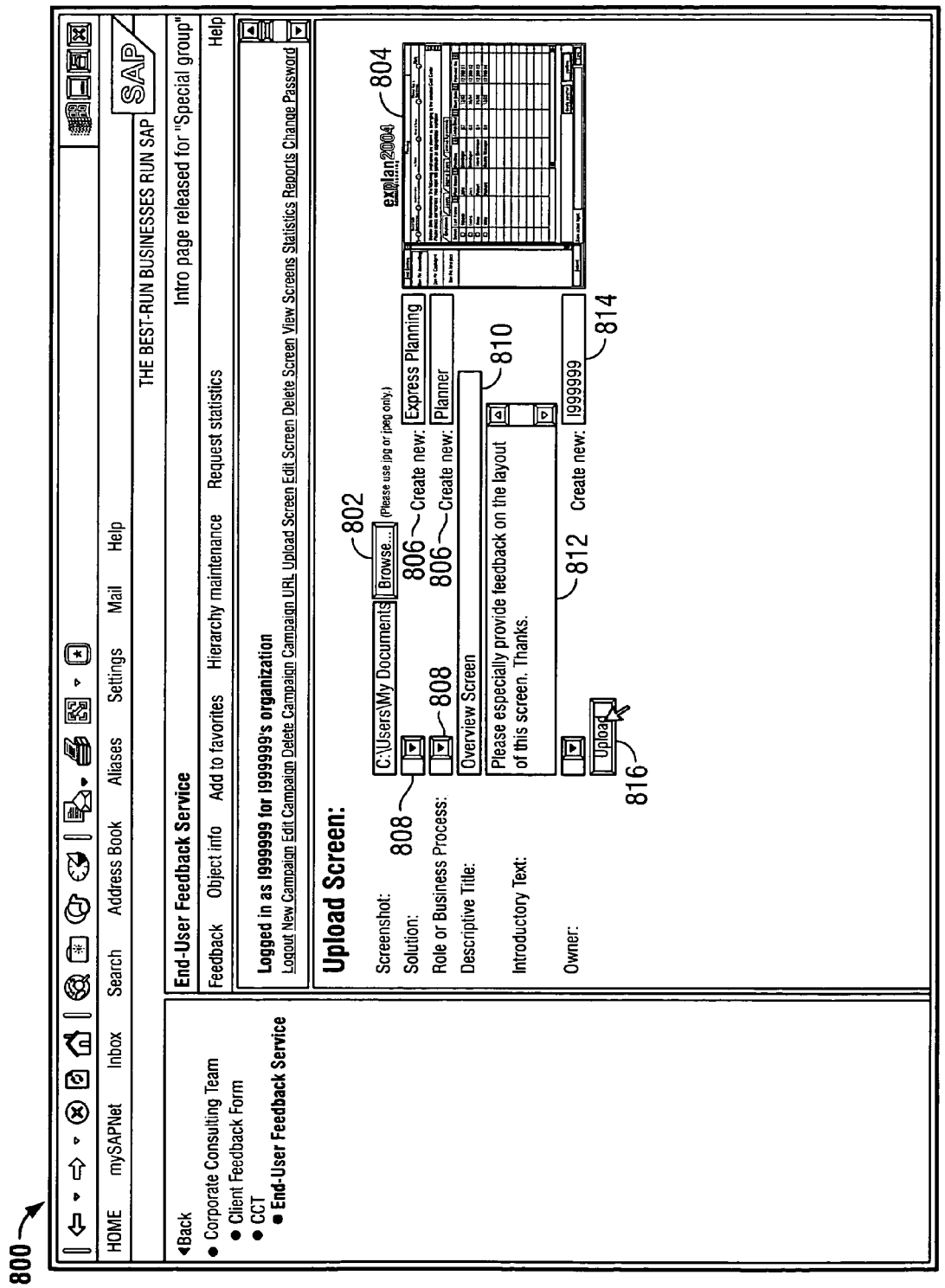

In FIG. 8, a screen 800 is shown for uploading visual content. The screen 800 includes a section 802 for uploading the visual content from a selected storage location, resulting in selection of a screen 804. Sections 806 and 808 allow the campaign manager 108 to associate the screen 804 with a new campaign/category, or with an existing campaign/category, respectively.

A section 810 allows the campaign manager 108 to enter a title for the screen 804, while a section 812 allows the campaign manager 108 to enter introductory text for the screen 804. Finally, a section 814 allows the campaign manager 108 to enter an appropriate new or existing user id number associated with the campaign, while a button 816 serves to activate uploading of the screen 804 to the campaign.

Figure 9:
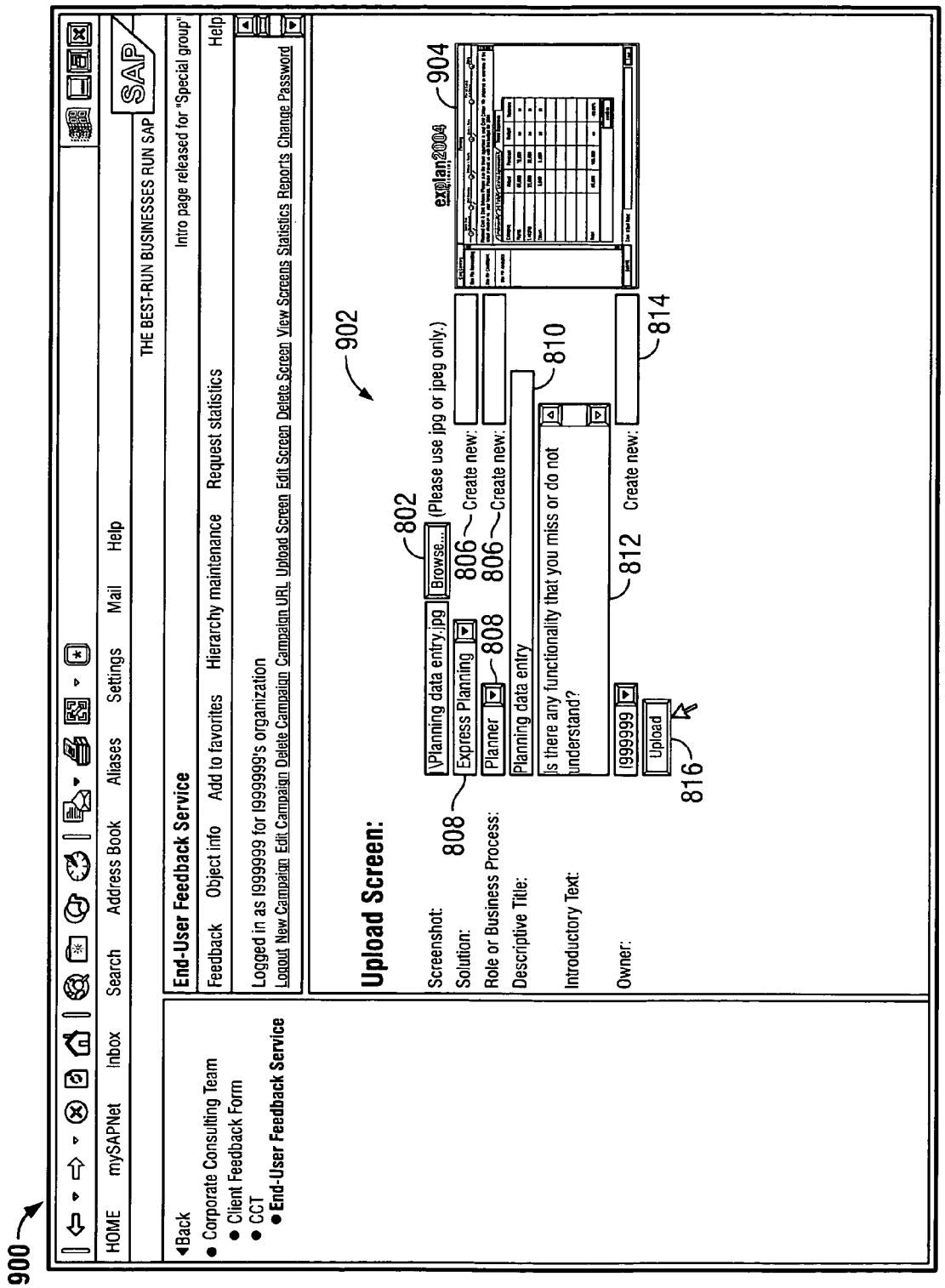

In FIG. 9, a screen 900 includes a section 902 for uploading an additional screen 904 to the "Express Planning" campaign. Remaining sections of the screen 900 correspond to similarly-numbered sections of screen 800, but with information corresponding to the screen 904.

Figure 10:
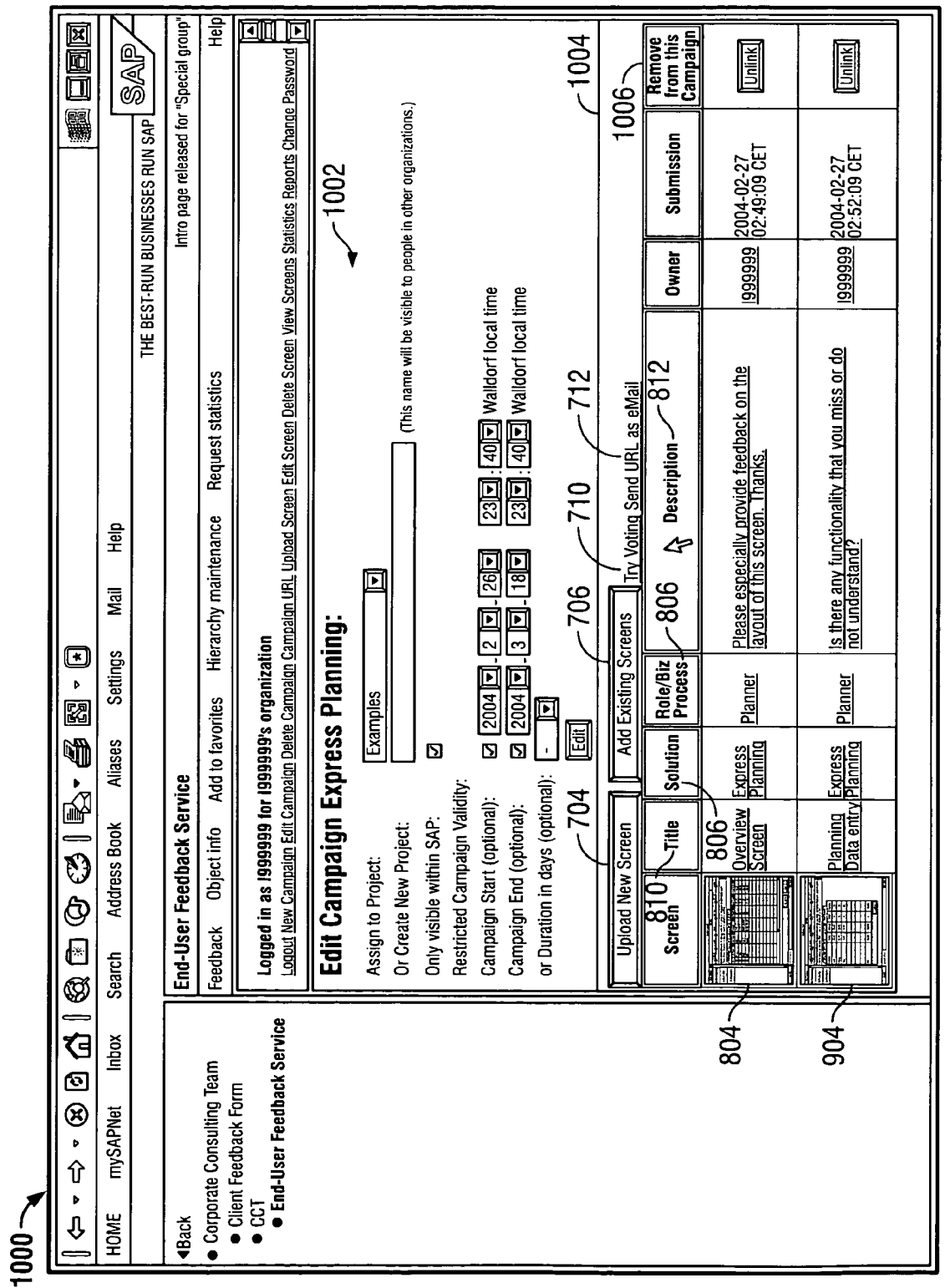

In FIG. 10, a screen 1000 allows the campaign manager 108 to edit a selected campaign by displaying relevant information about the campaign within a section 1002. A section 1004 provides thumbnail images of the screens 804 and 904 that are included within the campaign, along with the various types of information described above with respect to FIGS. 8 and 9, and any other relevant information that the campaign manager 108 may deem useful that is available from the system 102, including, for example, a section 1006 of the section 1004 that allows the campaign manager 108 to easily remove or unlink a selected one of the links 804 and 904 from the campaign.

Figure 11:
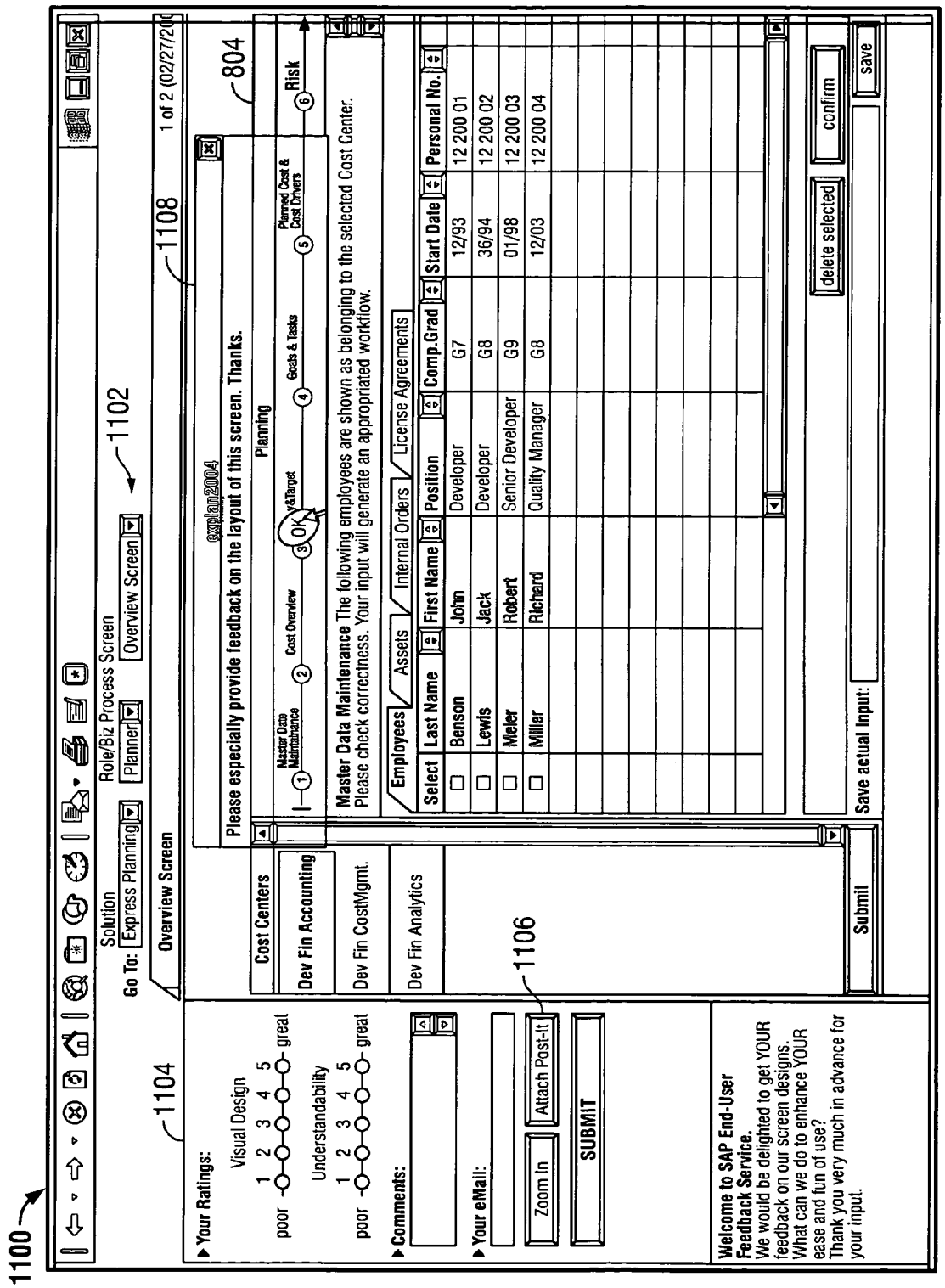

In FIG. 11, a screen 1100 represents a view of a receiving user who has been invited to participate in the campaign, e.g., the user B 134 of FIG. 1. The screen 1100 shows the screen 804, and identifies the relevant campaign in a section 1102. A section 1104 corresponds to the feedback section 140 of FIG. 1, and includes space for ratings/rankings from the receiving user, comments from the receiving user, or tools for the receiving user including the ability to zoom in on a section portion of the screen 804.

The section 1104 also includes a button 1106 allowing the receiving user to create a virtual note for attaching comments to the screen 804, as shown in more detail below. Finally in FIG. 11, a window 1108 provides the comments or introductory text previously entered by the campaign manager 108 (e.g., see section 812 of FIG. 8), which the receiving user may dispose of, or respond to, by pressing an "ok" button, or by other conventional techniques).

Figure 12:
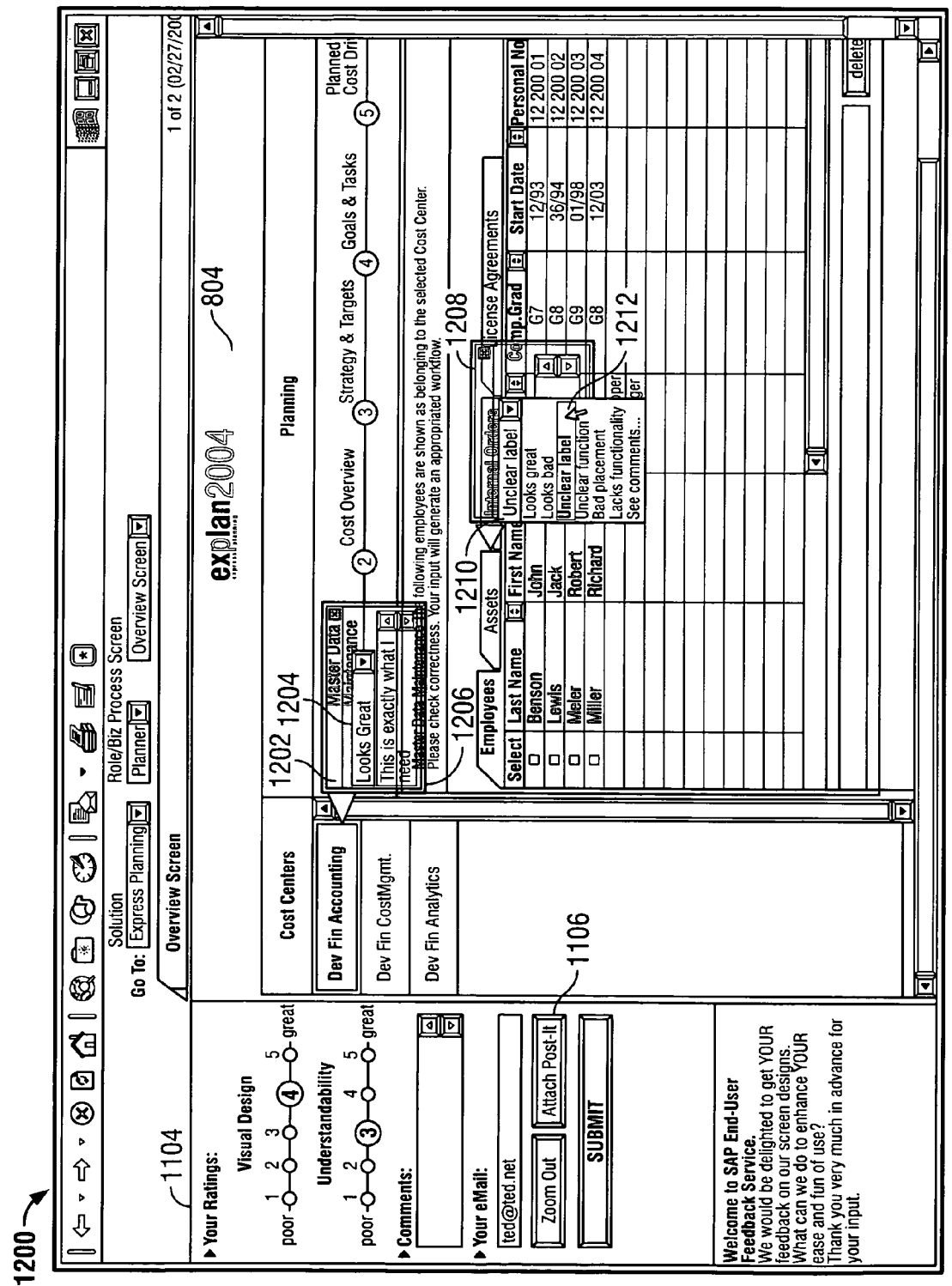

In FIG. 12, a screen 1200 shows a similar view as screen 1100, but for the screen 904. In FIG. 12, the receiving user has attached a first virtual note 1202, which includes a drop-down menu 1204 and a comments section 1206. The receiving user also has attached a second virtual note 1208, which also includes a drop-down menu 1210 and a comments section 1212. It should be understood from the above, and from FIG. 12, that the notes 1202 and 1208 may be placed anywhere on the screen 904 that is desired by the receiving user, so that the user may easily provide specific comments on particular sections of the screen 904.

Moreover, the virtual notes 1202 and 1208 allow the campaign manager 108 to view and aggregate results across a number of screens and/or users. For example, if the screen 904 is sent to a large number of users for feedback, the campaign manager 108 may be able to view that the label identified by the note 1208 received negative feedback from a certain percentage of the users (e.g., a number of notes were posted to that area, with a negative option selected from the drop-down menu 1210). Such information could be shown visually; for example, the campaign manager 108 may see green dots for positive comments, and red dots for negative comments, where the dots are placed on the screen 904 in association with notes placed by receiving users.

Figure 13:
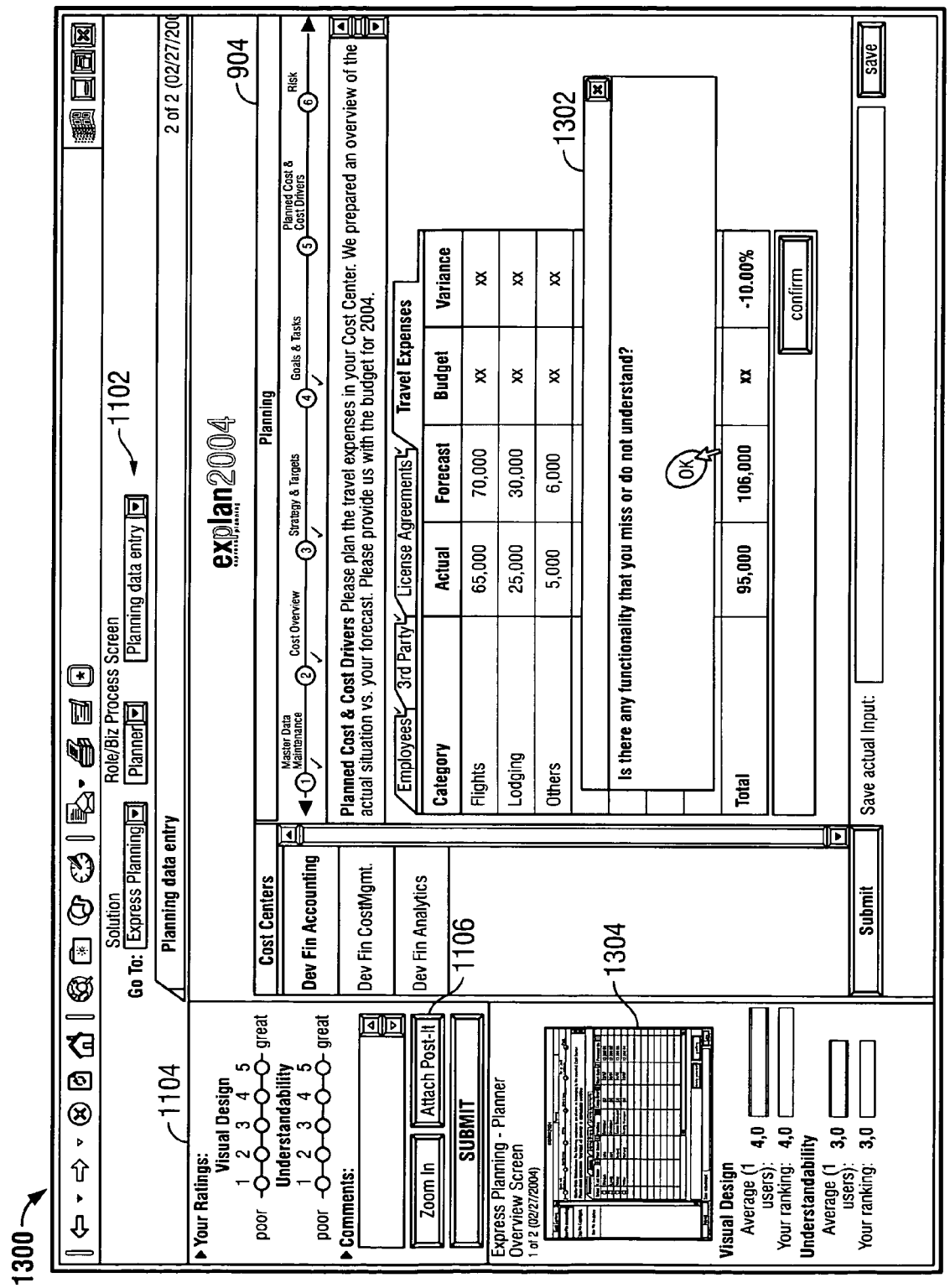

FIG. 13 shows a screenshot 1300 a view of a receiving user providing feedback on the screen 904. As in FIG. 11, the user is shown a window 1302 of introductory text. In FIG. 13, the receiving user also is shown, within the feedback section 1104, instant feedback regarding an average rating of the (previously-viewed and ranked) screen 804, as compiled from other users' feedback.

Figure 14:
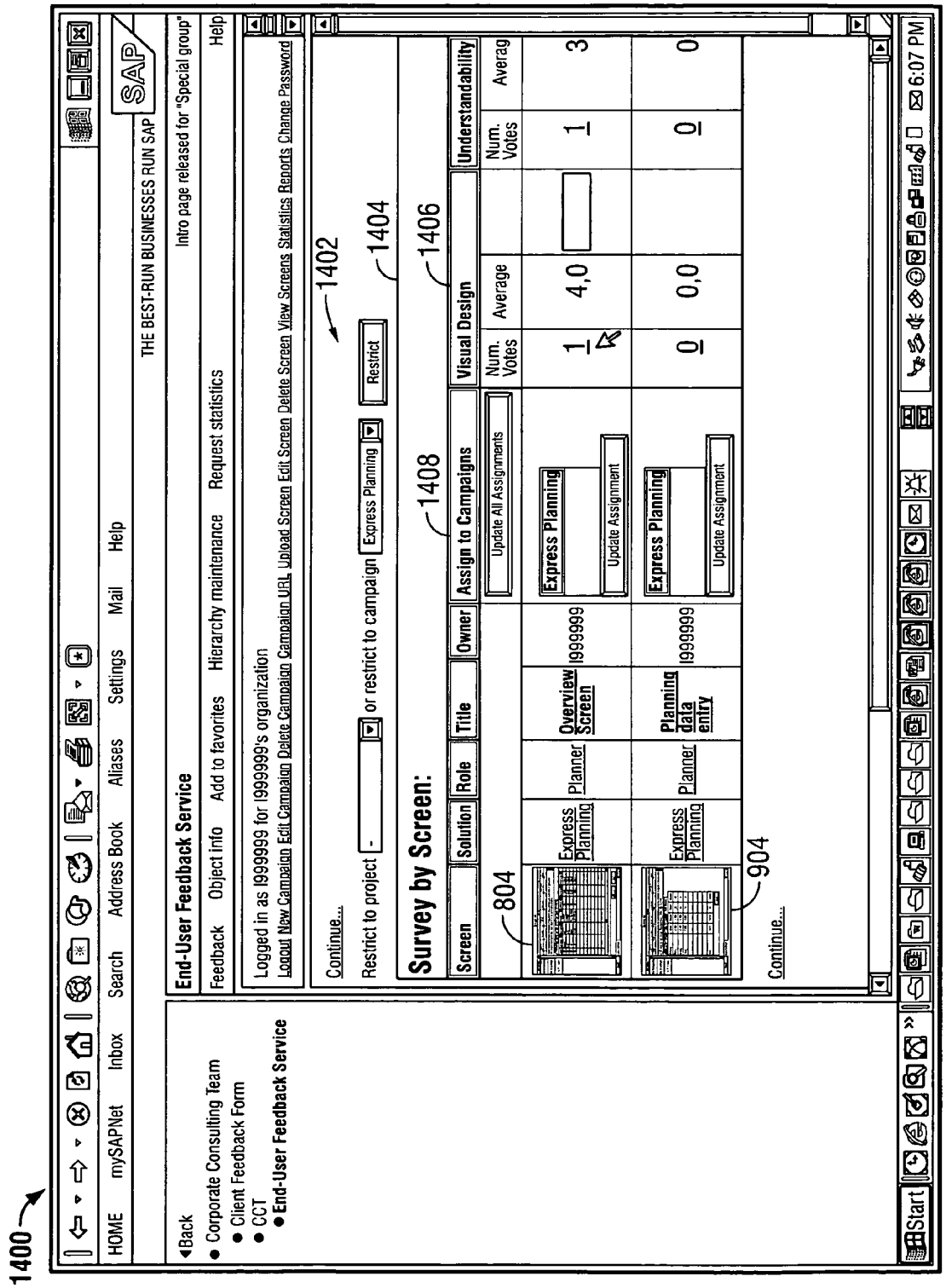
Figure 15:
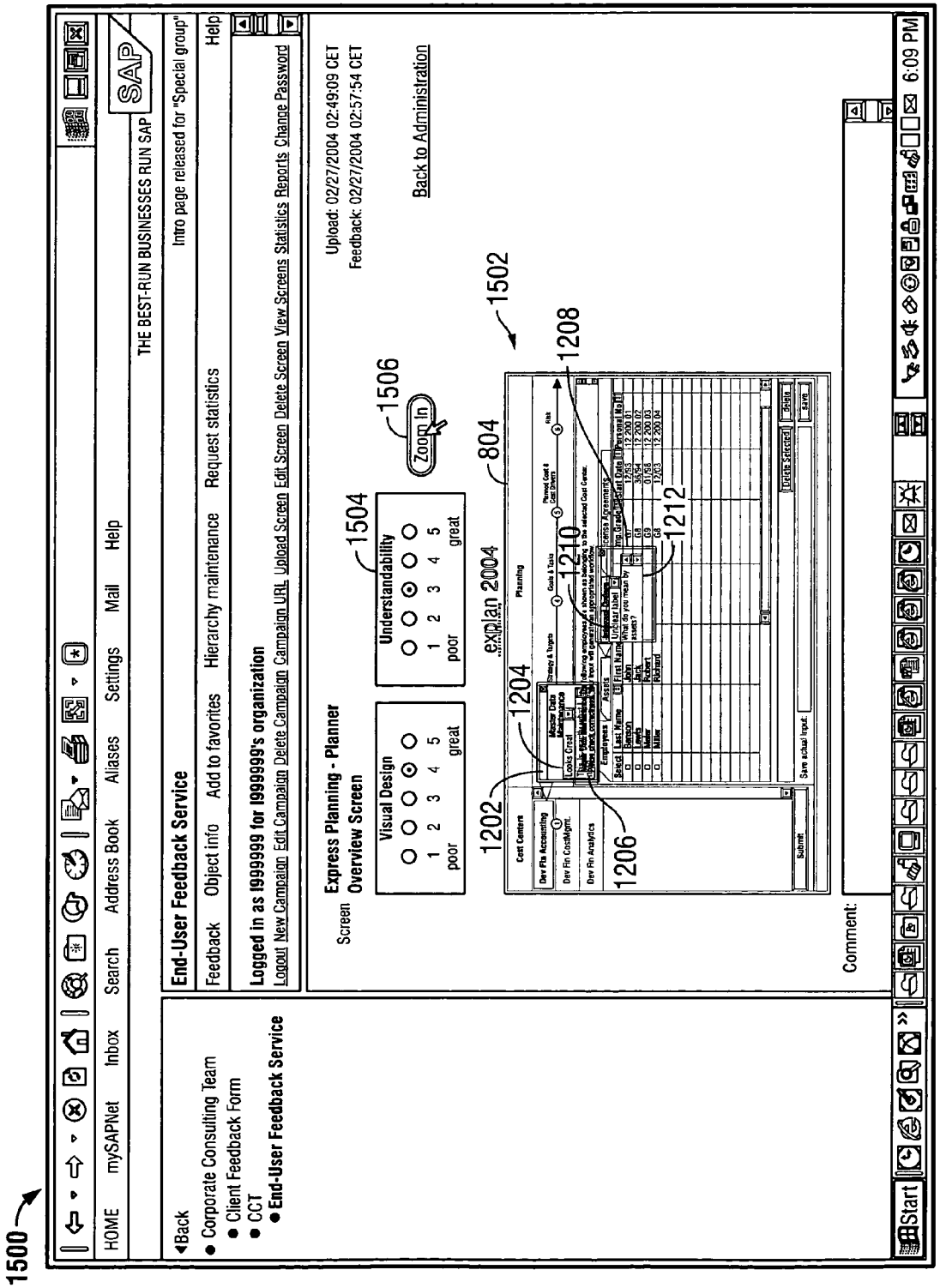
Figure 16:
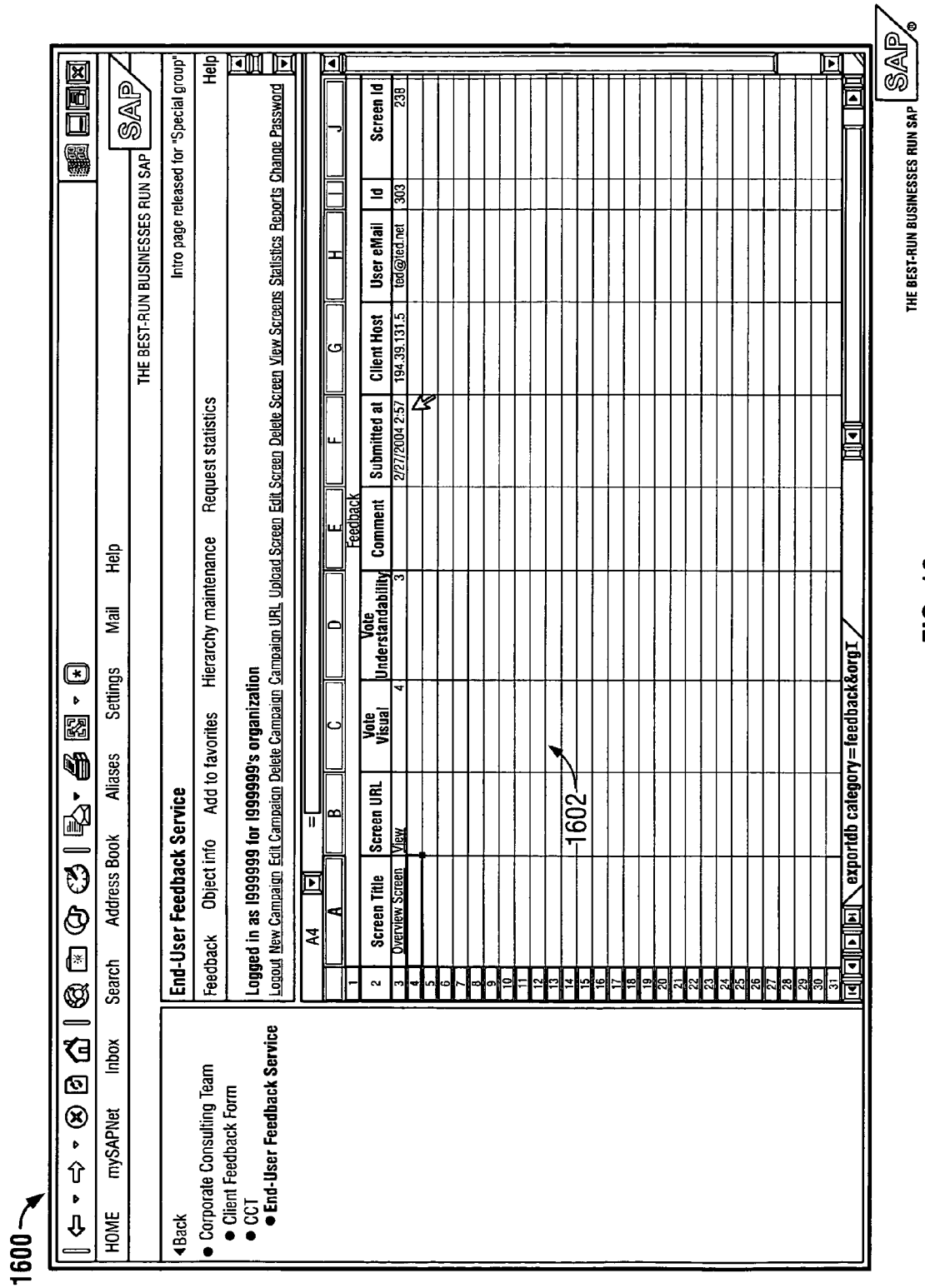

FIGS. 14-16 show screens 1400, 1500, and 1600, respectively, for allowing the campaign manager 108 to view results from the feedback campaign. In FIG. 14, a section 1402 identifies, and allows the campaign manager 108 to select, the relevant campaign, while a section 1404 provides information about the screens 804, 904, including identifying information about the screens 804, 904 and results of feedback regarding the screens 804, 904. For example, a section 1406 provides average rankings regarding the screens 804, 904, while a section 1408 allows the campaign manager 108 to associate one or both of the screens 804, 904 with additional campaigns.

In FIG. 15, a section 1502 allows the campaign manager 108 to view the screen 804 (i.e., a selected one of the screens from the screen 1400) as it was modified by a particular receiving user. A section 1504 shows ranking information provided by the user, while a button 1506 allows the campaign manager 108 to zoom in on a selected portion of the screen 804.

In FIG. 16, the campaign manager 108 is allowed to view feedback information without a thumbnail or other image of the relevant screen(s). Specifically, a section 1602 illustrates various information about a rated screen and the user who provided the information at hand.

Figure 17:
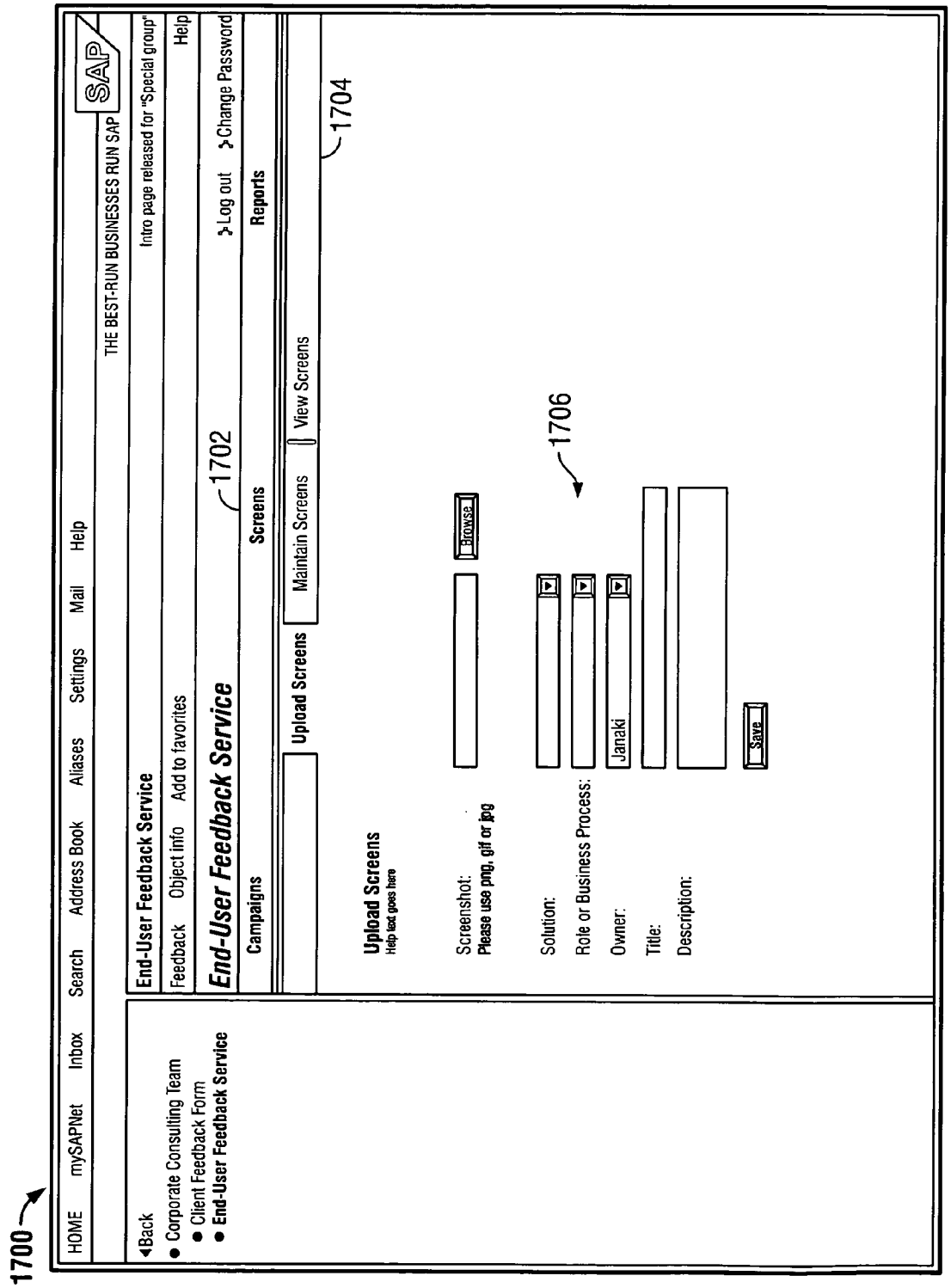
FIGS. 17-21 are screenshots of a second implementation of the system of FIG. 1.

FIGS. 17-21 are screenshots of a second implementation of the system of FIG. 1. In FIG. 17, a screen 1700 represents a screen for managing a campaign. A bar 1702 allows the campaign manager 108 to select a particular campaign(s), screen(s), or report(s), while a secondary bar 1704 illustrates sub-headings for a selected one of these categories.

The bar 1704 illustrates the options of uploading screens, maintaining screens, or viewing screens. As the option of uploading a screen is selected in the screen 1700, a section 1706 correspondingly displays information for uploading a screen, including a source file of the screen and descriptive information regarding the screen.

Figure 18:
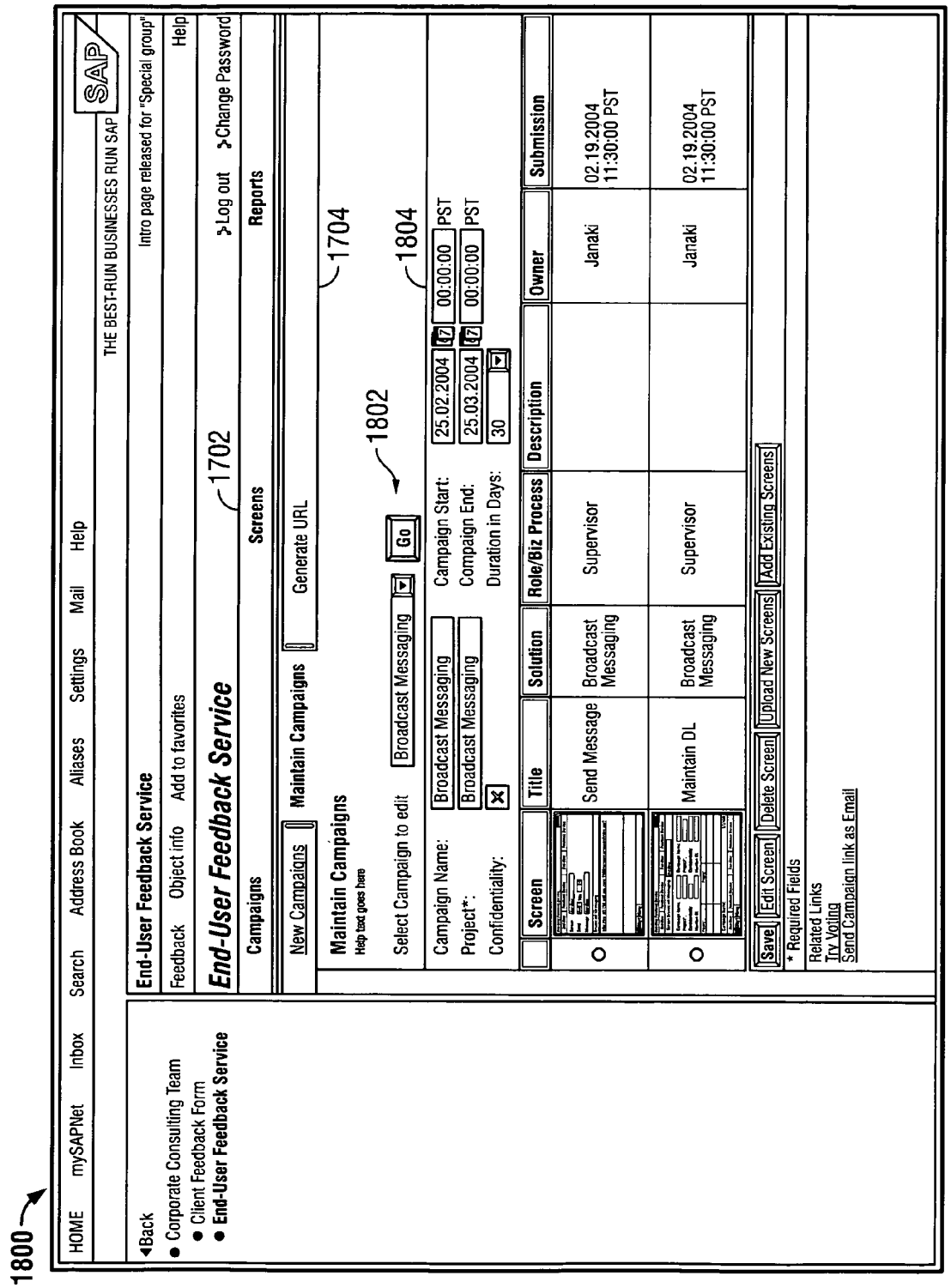

In FIG. 18, a screen 1800 illustrates a situation in which the 'maintain campaigns' option has been selected from the bar 1704. As a result, a section 1802 allows the campaign manager 108 to select a campaign called "Broadcast Messaging" for editing. A section 1804 provides information about this campaign, including thumbnail images of the screens within the campaign, and options for modifying these screens or their characteristics.

Figure 19:
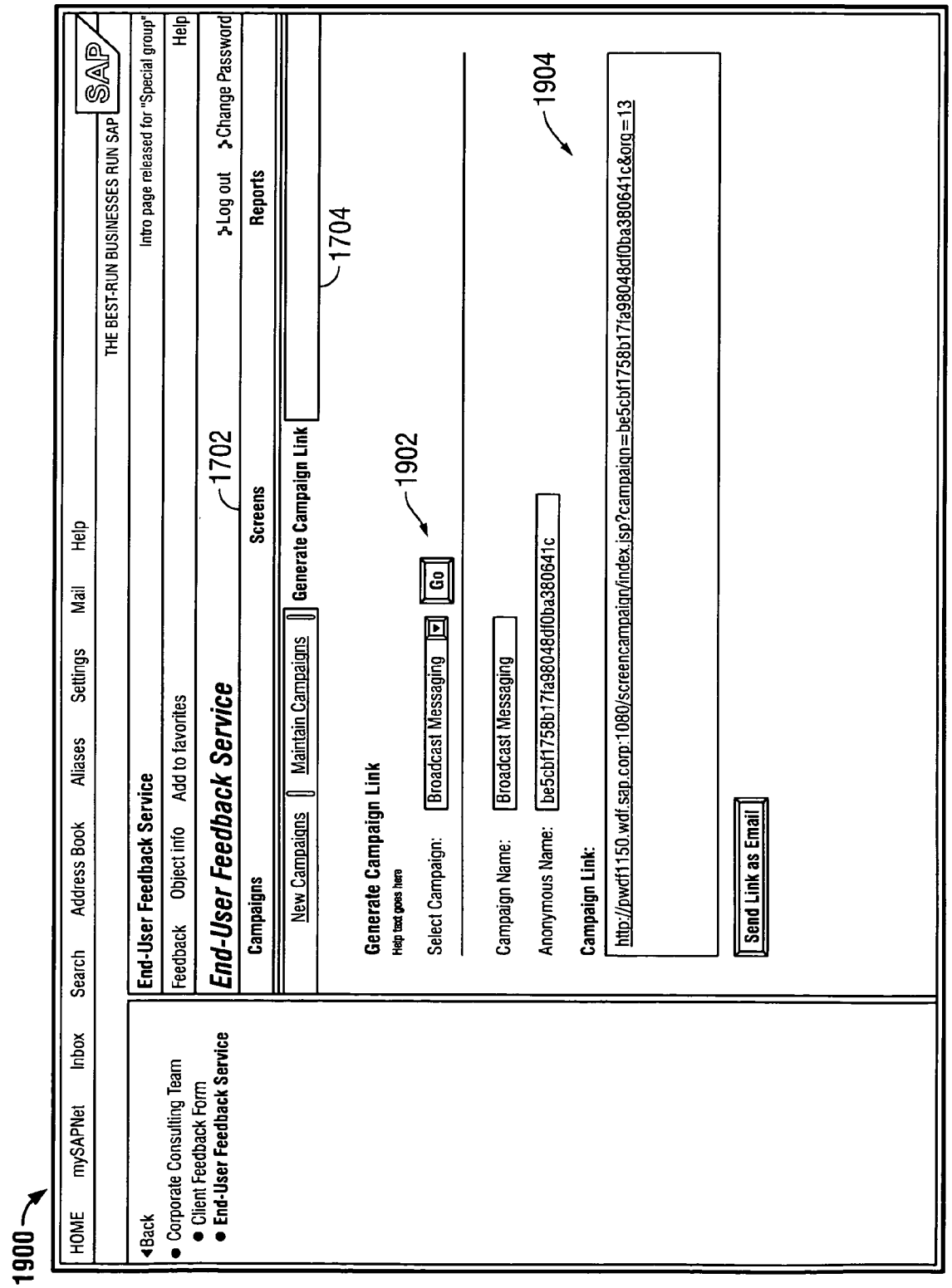

FIG. 19 is a screenshot 1900 illustrating a situation in which the 'generate campaign links' option has been selected from the bar 1704. As a result, a section 1902, similar to the section 1802, allows the campaign manager 108 to select the "Broadcast Messaging" campaign for generating a campaign link. Accordingly, a section 1904 illustrates a link to the campaign to be sent as part of an email to receiving users. It should be understood that the campaign manager 108 may include additional comments to the generated email. Also, either or both of the campaign manager 108 and the receiving user(s) may be anonymous in their participation in the campaign.

Figure 20:
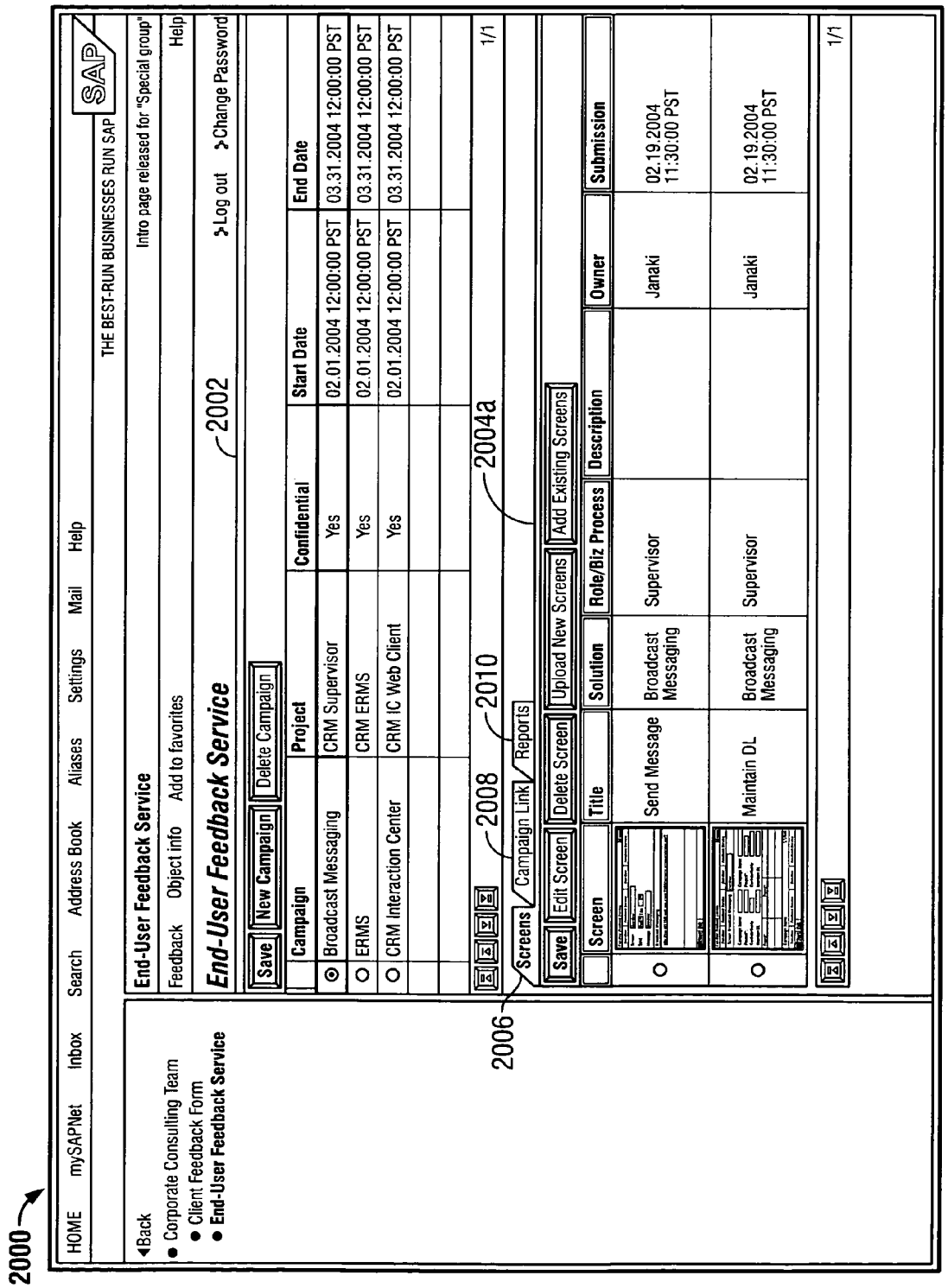
Figure 21:
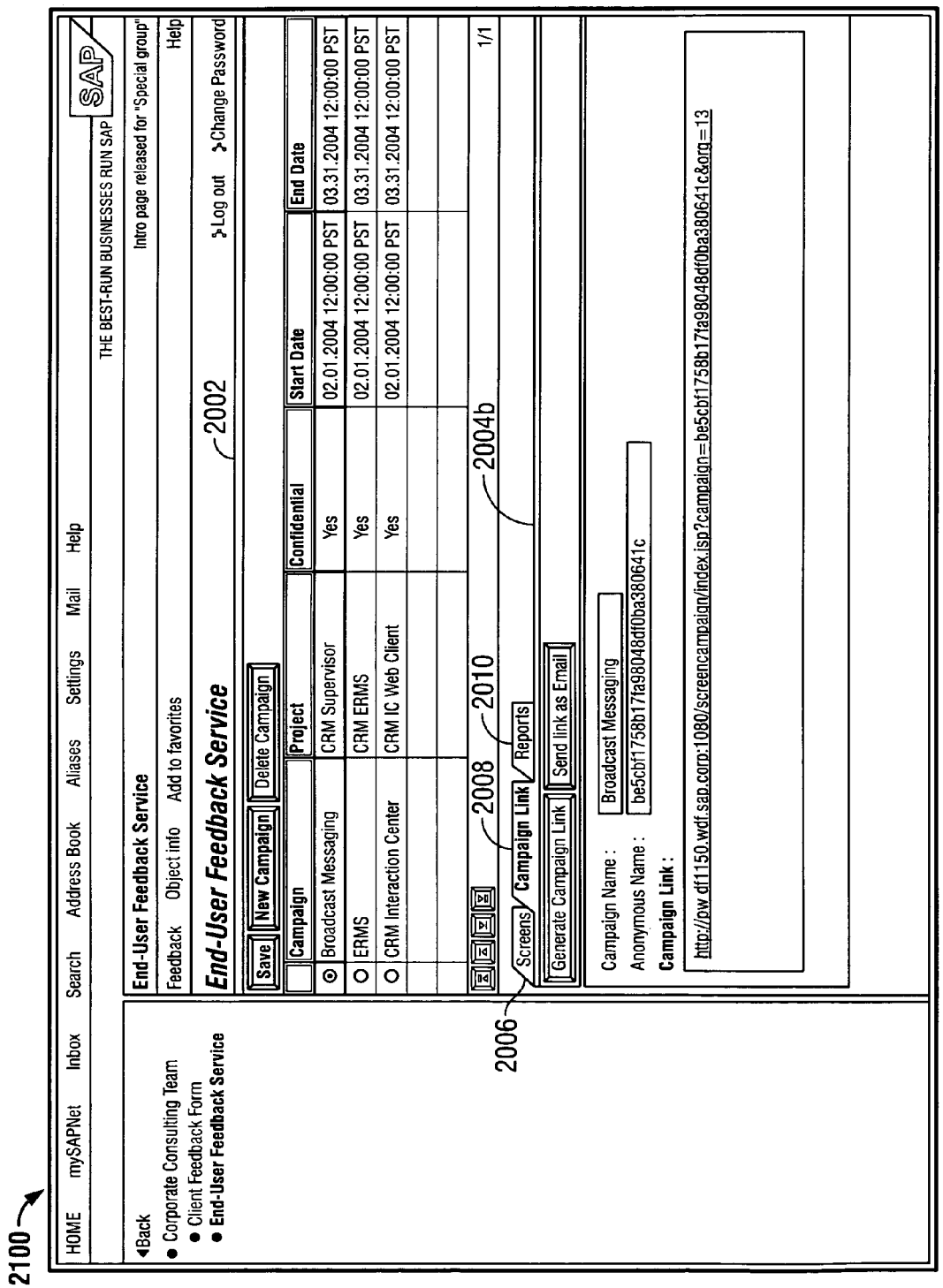

FIGS. 20 and 21 are screenshots 2000 and 2100 for displaying slightly modified campaign management tool(s). In FIG. 20, the campaign manager 108 is provided an overview of current campaigns in a section 2002, and selects the "Broadcast Messaging" campaign. Accordingly, the campaign manager 108 views the screens included in that campaign, along with descriptive information, in a section 2004a. That is, in FIG. 20, the campaign manager 108 selects a 'screens' tab 2006 in the section 2004 for viewing the specific screen information. In FIG. 21, the campaign manager 108 selects a 'campaign link' tab 1908 for generating and sending a link to a URL for the relevant campaign. Additionally, a 'reports' tab 2010 allows the campaign manager 108 to view a screen (not shown) for viewing results of feedback received regarding the "Broadcast Messaging" campaign.

Based on the above, it should be understood that the feedback system 102 provides a method for rapidly gathering and leveraging end-user feedback on visual content, in order to improve business software and business processes. Moreover, the end-users are empowered to use the feedback system 102 as they see fit, and may thus share in the benefits of both acquiring and providing valuable feedback on virtually any type of visual content.

Although the above discussion has been provided with respect to static visual content, it should be understood that interactive application content also may be used in the context of the feedback system 102. Other modifications and variations also may be implemented.

What is claimed is:

1. A system comprising a storage medium, an input device, and
   a feedback service operable to:
   receive a user interface screen from a first user,
   receive campaign characteristics from the first user,
   define, from the campaign characteristics, a feedback campaign to obtain feedback regarding the user interface from targeted users during a predefined period, the targeted users being users selected, based on the campaign characteristics, from among a group of users,
   associate the user interface screen and the first user with the feedback campaign,
   create a window that includes a feedback section and a visual representation of the user interface screen, the feedback section including feedback elements configured to receive feedback regarding the user interface screen from the targeted users during the predefined period, and the feedback elements including a virtual note operable to be freely placed, by a second user included among the targeted users, at a location anywhere within or around a portion of the user interface screen such that, after placement, the virtual note provides the location of the virtual note relative to the user interface screen and provides feedback specific to the portion of the user interface screen, wherein the location of the virtual note comprises (x,y) coordinates of the location of the virtual note relative to the user interface screen,
   distribute, after the feedback campaign is defined, the window to the targeted users according to the defined feedback campaign, the feedback elements and the user interface screen being concurrently presented in the window upon initial presentation of the window; and
   an administration service comprising a storage medium and operable to:
   provide the user interface screen and feedback elements to the targeted users as part of the feedback campaign,
   receive the feedback regarding the user interface screen input into the feedback elements during the feedback campaign,
   store the user interface screen and the feedback in association with the feedback campaign and the first user in the storage medium,
   associate the received feedback with the first user, the user interface screen, the feedback campaign, and the location of the virtual note; and
   display and analyze the associated feedback based on the location of the virtual note.

2. The system of claim 1 wherein the administration service is operable to register the first user according to a unique user identifier, so as to store the user interface screen and the feedback in association with the feedback campaign and the first user, according to the unique identifier.

3. The system of claim 1 wherein the feedback service is operable to receive the user interface screen by providing an upload screen to the first user with which the first user identifies an image file containing the user interface screen.

4. The system of claim 1 wherein the feedback service is operable to receive the user interface screen by way of a screen capture tool activated by the first user while the user interface screen is being locally displayed to the first user.

5. The system of claim 1 wherein the feedback elements include comments from the first user regarding the user interface screen or a type of desired feedback.

6. The system of claim 1 wherein the feedback elements comprise a ranking scale for allowing the second user to rank the user interface screen or portion thereof according to criteria defined by the first user.

7. The system of claim 6 wherein the feedback elements include ranking results compiled from the feedback received from the targeted users and related to a first user interface screen, while the targeted users view a second user interface screen that is different from the first user interface screen.

8. The system of claim 1 wherein the administration service is operable to distribute the user interface screen and the feedback elements to the targeted users by generating a link to the feedback campaign to be sent to the targeted users in an email to the targeted users.

9. The system of claim 1 wherein the administration service is operable to distribute the user interface screen and the feedback elements to the targeted users by including the user interface screen and the feedback elements within an email to the targeted users.

10. The system of claim 1 wherein the administration service includes a results manager operable to compile results of the feedback campaign according to criteria selected by the first user.

11. A computer-implemented method comprising:
    receiving, at a feedback system, a user interface screen from a first user;
    receiving, at the feedback system, campaign characteristics from the first user;
    defining, at the feedback system, from the campaign characteristics, a feedback campaign to obtain feedback regarding the user interface from targeted users during a predefined period, the targeted users being users selected, based on the campaign characteristics, from among a group of users;

associating, at the feedback system, the user interface screen and the first user with the feedback campaign;

creating, at the feedback system, a window that includes a feedback section and a visual representation of the user interface screen, the feedback section including feedback elements configured to receive feedback regarding the user interface screen from the targeted users during the predefined period, the feedback elements including a virtual note operable to be freely placed, by a second user included among the targeted users, at a location anywhere within or around a portion of the user interface screen such that, after placement, the virtual note provides the location of the virtual note relative to the user interface screen and provides feedback specific to the portion of the user interface screen, wherein the location of the virtual note comprises (x,y) coordinates of the location of the virtual note relative to the user interface screen;

distributing, after defining the feedback campaign, the window to the targeted users according to the defined feedback campaign, the feedback elements and the user interface screen being concurrently presented in the window upon initial presentation of the window;

receiving, at the feedback system, the feedback regarding the user interface screen input into the feedback elements during the feedback campaign;

associating, at the feedback system, the received feedback with the first user, the user interface screen, the feedback campaign, and the location of the virtual note;

analyzing the associated feedback based on the location of the virtual note; and displaying, at the feedback system, the analyzed feedback to the first user.

12. The method of claim 11 wherein receiving the user interface screen from the first user comprises registering the first user in association with a user identifier.

13. An apparatus comprising a storage medium having instructions stored thereon, the instructions comprising one or more code segments configured to:

receive a user interface screen from a first user;

receive campaign characteristics from the first user;

define from the campaign characteristics, a feedback campaign to obtain feedback regarding the user interface from targeted users during a predefined period, the targeted users being users selected, based on the campaign characteristics, from among a group of users;

associate the user interface screen and the first user with the feedback campaign;

create a window that includes a feedback section and a visual representation of the user interface screen, the feedback section including feedback elements configured to receive feedback regarding the user interface screen from the targeted users during the predefined period, the feedback elements including a virtual note operable to be freely placed, by a second user included among the targeted users, at a location anywhere within or around a portion of the user interface screen such that, after placement, the virtual note provides the location of the virtual note relative to the user interface screen and provides feedback specific to the portion of the user interface screen, wherein the location of the virtual note comprises (x,y) coordinates of the location of the virtual note relative to the user interface screen;

distribute, after defining the feedback campaign, the window to the targeted users according to the defined feedback campaign, the feedback elements and the user interface screen being concurrently presented in the window upon initial presentation of the window;

receive the feedback regarding the user interface screen input into the feedback elements by the targeted users during the feedback campaign;

associate the received feedback with the first user, the user interface screen, the feedback campaign, and the location of the virtual note;

analyze the associated feedback based on the location of the virtual note; and display the analyzed feedback to the first user.

14. The apparatus of claim 13, wherein the feedback elements include comments from the first user regarding the user interface screen or a type of desired feedback.

15. The method of claim 11, wherein the campaign characteristics comprise a type of user interface screen to be provided during the feedback campaign.

16. The method of claim 11, wherein distributing the window to the targeted users comprises providing the window to a first group of users that have access to a private network and to a second group of users that do not have access to the private network.

17. The method of claim 11, wherein distributing the window to the targeted users comprises inviting the targeted users to participate in the feedback campaign by emailing a link associated with the user interface screen to the targeted users.

18. The method of claim 11 further comprising:

aggregating the associated received feedback with feedback received in a second feedback campaign occurring after the feedback campaign, the feedback received in the second feedback campaign being associated with the user interface screen, the second feedback campaign, and a location of a second virtual note placed at a second location in a second portion of the user interface screen during the second feedback campaign;

comparing the first location to the second location;

determining, from the comparison, that the second portion of the user interface screen is in the vicinity of the portion of the user interface screen of the feedback campaign; and identifying the second portion as a problem portion based on the determination.

19. The system of claim 1, wherein the virtual note comprises one or more of a drop-down menu, a textbox for entering textual comments, or a visual indicator associated with a particular type of feedback.

20. The system of claim 1, wherein the virtual note is configured to receive textual comments regarding the portion of the user interface screen.

21. The system of claim 1, wherein the virtual note is operable to be freely placed within or around a visual content of the user interface screen.

22. The method of claim 11, wherein the virtual note is operable to be freely placed within or around a visual content of the user interface screen.

23. The apparatus of claim 13, wherein the virtual note is operable to be freely placed within or around a visual content of the user interface screen.

* * * * *